United States Patent
Kure et al.

(10) Patent No.: US 10,785,515 B2
(45) Date of Patent: Sep. 22, 2020

(54) COMMUNICATION CONTROL DEVICE, COMMUNICATION CONTROL METHOD, AND COMMUNICATION SYSTEM

(71) Applicant: SONY CORPORATION, Tokyo (JP)

(72) Inventors: Yoshinobu Kure, Kanagawa (JP); Vijitha Ranatunga, Kanagawa (JP); Yoshihiro Kosaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 546 days.

(21) Appl. No.: 15/508,666

(22) PCT Filed: Aug. 25, 2015

(86) PCT No.: PCT/JP2015/073902
§ 371 (c)(1),
(2) Date: Mar. 3, 2017

(87) PCT Pub. No.: WO2016/039135
PCT Pub. Date: Mar. 17, 2016

(65) Prior Publication Data
US 2017/0280173 A1    Sep. 28, 2017

(30) Foreign Application Priority Data

Sep. 10, 2014    (JP) .................................. 2014-184238

(51) Int. Cl.
*H04L 12/927* (2013.01)
*H04L 12/913* (2013.01)
(Continued)

(52) U.S. Cl.
CPC ....... *H04N 21/2385* (2013.01); *H04L 47/724* (2013.01); *H04L 47/748* (2013.01);
(Continued)

(58) Field of Classification Search
CPC ...................................................... H04L 47/806
(Continued)

(56) References Cited

U.S. PATENT DOCUMENTS 7,558,199 B1 * 7/2009 Minei ................. H04L 41/0896
370/230
2004/0057412 A1    3/2004 Curcio et al.
(Continued)

FOREIGN PATENT DOCUMENTS

CN        101605142 A    12/2009
EP        2 675 132 A1   12/2013
(Continued)

OTHER PUBLICATIONS

International Search Report dated Nov. 17, 2015 in PCT/JP2015/073902 filed Aug. 25, 2015.
(Continued)

*Primary Examiner* — Sm A Rahman
*Assistant Examiner* — Emad Siddiqi
(74) *Attorney, Agent, or Firm* — Oblon, McClelland, Maier & Neustadt, L.L.P.

(57) ABSTRACT

[Object] To provide a communication control device configured to efficiently secure bands of an IP network in order to transmit data streams.
[Solution] There is provided a communication control device including: a channel information acquisition unit configured to acquire, when AV streams are transmitted from a plurality of transmission apparatuses to one or more reception apparatuses on an IP network while being switched, all channel information from the transmission apparatuses to the reception apparatuses; a traffic calculation unit configured to calculate a maximum traffic generated in switching patterns of the transmission of the AV streams from the transmission apparatuses to the reception appara-
(Continued)

tuses, on the basis of the channel information acquired by the channel information acquisition unit; and a transmission band reservation unit configured to reserve a transmission band on the IP network, on the basis of the maximum traffic calculated by the traffic calculation unit.

13 Claims, 23 Drawing Sheets

(51) Int. Cl.
    *H04L 12/911*     (2013.01)
    *H04N 21/2385*     (2011.01)
    *H04L 29/06*     (2006.01)
    *H04N 21/258*     (2011.01)
    *H04N 21/431*     (2011.01)
    *H04N 21/436*     (2011.01)
    *H04N 21/438*     (2011.01)
    *H04N 21/6405*     (2011.01)

(52) U.S. Cl.
    CPC ........ *H04L 47/806* (2013.01); *H04L 65/1069* (2013.01); *H04L 65/4076* (2013.01); *H04L 65/80* (2013.01); *H04N 21/25866* (2013.01); *H04N 21/431* (2013.01); *H04N 21/436* (2013.01); *H04N 21/4384* (2013.01); *H04N 21/6405* (2013.01)

(58) Field of Classification Search
    USPC .......................................................... 709/226
    See application file for complete search history.

(56) References Cited

U.S. PATENT DOCUMENTS

| | | |
|---|---|---|
| 2005/0157742 A1 | 7/2005 | Chen et al. |
| 2010/0054265 A1* | 3/2010 | Lv .......................... H04L 45/023 370/400 |
| 2011/0093569 A1 | 4/2011 | Yamagishi |
| 2012/0099605 A1* | 4/2012 | Stanton .................. H04L 47/805 370/463 |
| 2013/0286846 A1* | 10/2013 | Atlas ..................... H04L 47/726 370/236 |
| 2013/0339537 A1 | 12/2013 | Joy et al. |
| 2014/0226660 A1 | 8/2014 | Stanton |

FOREIGN PATENT DOCUMENTS

| | | |
|---|---|---|
| JP | 2004-32114 A | 1/2004 |
| JP | 2006-229966 A | 8/2006 |

OTHER PUBLICATIONS

Extended European Search Report dated Aug. 22, 2017 in Patent Application No. 15840751.0.

\* cited by examiner

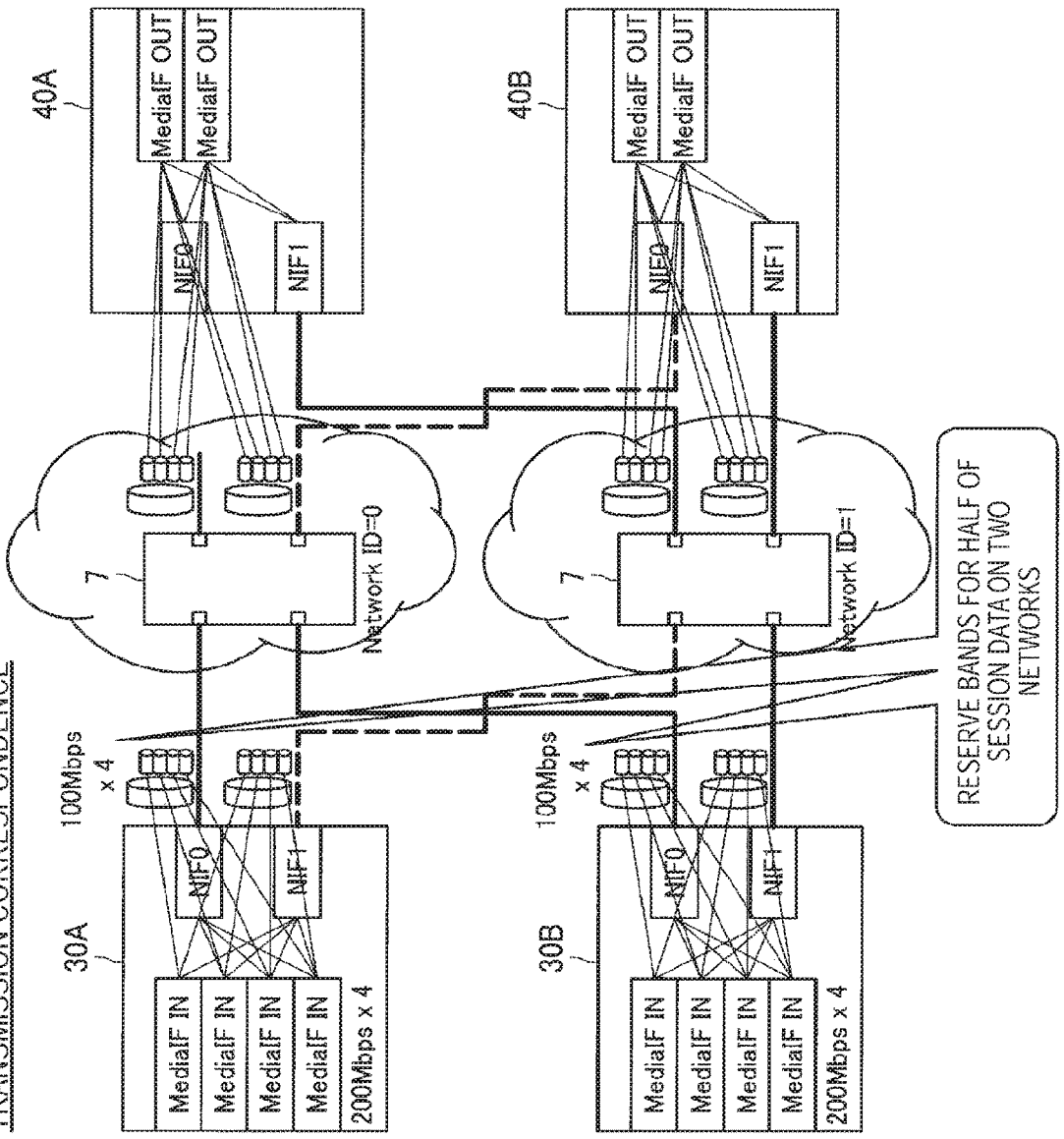

COMMUNICATION CONTROL DEVICE, COMMUNICATION CONTROL METHOD, AND COMMUNICATION SYSTEM

TECHNICAL FIELD

The present disclosure relates to a communication control device, a communication control method, and a communication system.

BACKGROUND ART

Recently, Internet protocol (IP) multicast transmission is sometimes used for transmitting one data stream to a plurality of reception apparatuses and for the plurality of reception apparatuses to process and display the same data stream. The following patent literature 1 may be cited as the literature describing such multicast transmission.

CITATION LIST

Patent Literature

Patent Literature 1: JP 2004-32114A

DISCLOSURE OF INVENTION

Technical Problem

In IP multicast transmission of data streams as described above, it is desirable to preliminarily secure bands for transmitting data streams between transmission apparatuses and reception apparatuses prior to transmission of the data streams. On the other hand, in the multicast transmission as described above, securing the band for transmitting the data streams is required to be performed efficiently so as not to affect other traffic.

Therefore, the present disclosure proposes a new and improved communication control device, communication control method, and communication system configured to efficiently secure bands for transmitting data streams.

Solution to Problem

According to the present disclosure, there is provided a communication control device including: a channel information acquisition unit configured to acquire, when AV streams are transmitted from a plurality of transmission apparatuses to one or more reception apparatuses on an IP network while being switched, all channel information from the transmission apparatuses to the reception apparatuses; a traffic calculation unit configured to calculate a maximum traffic generated in switching patterns of the transmission of the AV streams from the transmission apparatuses to the reception apparatuses, on the basis of the channel information acquired by the channel information acquisition unit; and a transmission band reservation unit configured to reserve a transmission band on the 1P network, on the basis of the maximum traffic calculated by the traffic calculation unit.

According to the present disclosure, there is provided a communication control method including: acquiring, when AV streams are transmitted from a plurality of transmission apparatuses to one or more reception apparatuses on an IP network while being switched, all channel information from the transmission apparatuses to the reception apparatuses; calculating a maximum traffic generated in switching patterns of the transmission of the AV streams from the transmission apparatuses to the reception apparatuses, on the basis of the acquired channel information; and reserving a transmission band on the IP network, on the basis of the calculated maximum traffic.

According to the present disclosure, there is provided a communication control system including: a plurality of transmission apparatuses connected to an IP network; one or more reception apparatuses connected to the IP network; and a communication control device connected to the IP network. The communication control device includes a channel information acquisition unit configured to acquire, when AV streams are transmitted from the plurality of transmission apparatuses to the one or more reception apparatuses on the IP network while being switched, all channel information from the transmission apparatuses to the reception apparatuses, a traffic calculation unit configured to calculate a maximum traffic generated in switching patterns of the transmission of the AV streams from the transmission apparatuses to the reception apparatuses, on the basis of the channel information acquired by the channel information acquisition unit, and a transmission band reservation unit configured to reserve a transmission band on the IP network, on the basis of the maximum traffic calculated by the traffic calculation unit.

Advantageous Effects of Invention

According to the present disclosure as described above, there can be provided a new and improved communication control device, communication control method, and communication system configured to efficiently secure bands for transmitting data streams.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15A is an explanatory diagram illustrating band reservation by the network resource management server 20 in a case of stream load distributed transmission.

MODE(S) FOR CARRYING OUT THE INVENTION

Figure 1:
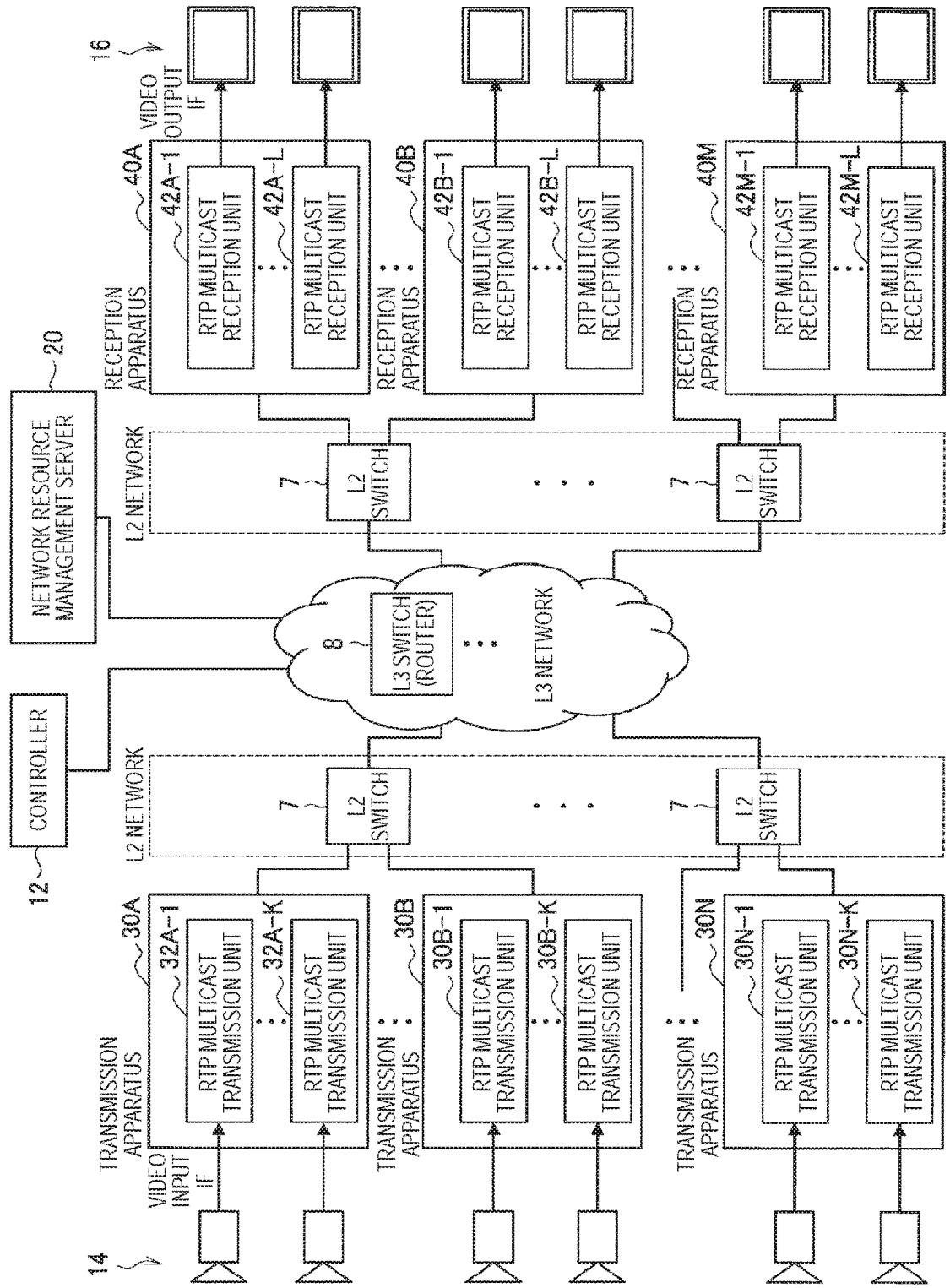
FIG. 1 is an explanatory diagram illustrating an entire configuration example of a relay management system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in the present specification and the drawings, sometimes a plurality of elements that has substantially the same function and structure is distinguished by different alphabets attached after the same reference signs. For example, a plurality of elements that has substantially the same function and structure or logical meaning is distinguished as needed as transmission apparatuses 30A, 30B, and 30C. Note that, when the plurality of elements that has substantially the same function and structure does not have to be distinguished individually in particular, only the same reference sign is attached. For example, when the transmission apparatuses 30A, 30B, and 30C do not have to be distinguished in particular, each of these apparatuses is simply called a transmission apparatus 30.

Note that description will be provided in the following order.
1. Embodiment of present disclosure
 1.1. Background
 1.2. System configuration example
 1.3. Configuration example of network resource management server
 1.4. System operation example
2. Hardware configuration example
3. Summary

1. EMBODIMENT OF PRESENT DISCLOSURE 1.1. Background

Before explaining an embodiment of the present disclosure in detail, a background of the embodiment of the present disclosure will be described first.

As has been described above, IP multicast transmission is sometimes used to transmit one data stream to a plurality of reception apparatuses, so that the plurality of reception apparatuses processes and displays the same data stream. A communication band of a communication network is preliminarily reserved in IP multicast transmission of the data stream in the aforementioned manner.

As an existing technique, there is a description relating to a band reservation method in an MPLS (Multi Protocol Label Switching) network using RSVP-TE (Resource reSerVation Protocol Traffic Engineering) in IETF (Internet Engineering Task Force) RFC 3209 "RSVP-TE: Extensions to RSVP for LSP Tunnels".

In addition, as an existing technique, there is a description relating to Label Switched Path (LSP) setting methods of point-to-multipoint (P2MP) and multipoint-to-multipoint (MP2MP) in an MPLS network, in IETF RFC 6388 "Label Distribution Protocol Extensions for Point-to-Multipoint and Multipoint-to-Multipoint Label Switched Paths".

IETF RFC 3209 allows shared band reservation for multicast streams from a plurality of transmission sources by using Wildcard Filter (WF) Style or Shared Explicit (SE) Style. In addition, using the method described in IETF RFC 6388 allows many-to-many multi cast LSP setting in an MPLS network. Combined use of these methods allows band reservation for many-to-many communication to be realized.

However, band reservation using RSVP-TE results in a single reserved band on the LSP, and therefore band reservation using RSVP-TE cannot be used in a case where a different bandwidth is required for each link. In addition, although band reservation using RSVP-TE allows band reservation in an MPLS network including MPLS devices complying with RSVP, band reservation on an IP network including a relay device which does not comply with RSVP such as an IP router or an Ethernet (registered trademark) switch cannot be performed. In addition, band reservation using RSVP-TE assumes distributed management for each relay device, and therefore does not support centralized management that centralizes network management into one device.

In addition, it is desirable in IP multicast transmission of data stream to preliminarily secure bands for transmitting data streams between the transmission apparatuses and the reception apparatuses before transmitting the data stream. This is because, when data streams are switched at the reception apparatus side which receives data streams, the data streams cannot be received without interruption unless bandwidth is secured. This requirement is particularly important in a routing switcher function (AV routing) for broadcast production on an IP network used in the broadcast station or the like, which requires reception switching (crosspoint switching) of AV streams without interruption at the reception apparatus side, particularly when data streams (AV streams) including video and sound are transmitted.

On the other hand, in IP multicast transmission of data streams as described above, securing of bands for transmitting data streams is required to be performed efficiently so as not to affect other traffic. In other words, securing bands more than required for a group including a plurality of transmission apparatuses and a plurality of reception apparatuses may prevent other groups from securing bands.

The applicant of the present disclosure therefore has intensively examined techniques that allow centralized network management to perform band reservation efficiently in an IP network in which a different bandwidth is required for each link. As a result, the applicant of the present disclosure has come up with a technique that allows centralized network management to perform efficient band reservation in an IP network in which a different bandwidth is required for each link, as will be described below.

A background of the embodiment of the present disclosure has thus been described above. Subsequently, a configuration example of a relay management system according to the embodiment of the present disclosure will be described.

1.2. System Configuration Example

FIG. 1 is an explanatory diagram illustrating an entire configuration example of the relay management system according to the embodiment of the present disclosure. In the following, the entire configuration example of the relay management system according to the embodiment of the present disclosure will be described, referring to FIG. 1.

As illustrated in FIG. 1, the relay management system according to the embodiment of the present disclosure includes a controller 12, a plurality of imaging apparatuses 14, a plurality of display apparatuses 16, a network resource management server 20, transmission apparatuses 30A to 30N, reception apparatuses 40A to 40M, a plurality of L2 switches 7, and a plurality of L3 switches 8, and performs multicast transmission from the N transmission apparatuses 30 to the M reception apparatuses 40.

Each of the transmission apparatuses 30 includes at least one real-time transport protocol (RTP) multicast transmission unit 32. The RTP multicast transmission unit 32 receives input of a video/voice data stream from the imaging apparatus 14 via a video input IF, for example, and the RTP multicast transmission unit 32 multicast-transmits the input data stream. Each of the transmission apparatuses 30 also can multicast-transmit a plurality of data streams from the plurality of RTP multicast transmission units 32.

Each of the reception apparatuses 40 includes at least one RTP multicast reception unit 42. The RTP multicast reception unit 42 receives the data stream which is multicast-transmitted from the transmission apparatus 30 and relayed by an L2 network and an L3 network. The data stream received by the RTP multicast reception unit 42 is output to the display apparatus 16 via a video output IF to be displayed on the display apparatus 16, for example. Each of the reception apparatuses 40 also can receive the plurality of data streams multicast-transmitted, by the plurality of RTP multicast reception units 42.

Note that, in the following description, a device for editing a data stream received by the reception apparatus 40 may also be referred to as a display apparatus 16.

The L2 switch 7 relays data transmission between the transmission apparatus 30 or the reception apparatus 40 and the L3 network. The L3 switch 8 relays data transmission between the L2 network on the transmission apparatus 30 side and an L2 network on the reception apparatus 40 side. Note that, in the present specification, sometimes the L2 switch 7 and the L3 switch 8 are collectively called a relay apparatus 10.

The controller 12 transmits an instruction about the multicast transmission in the relay management system to the network resource management server 20. For example, the controller 12, when a transmission apparatus 30 or a reception apparatus 40 to participate in the multicast transmission is specified by operator's operation, transmits information of the specified transmission apparatus 30 or the reception apparatus 40 to the network resource management server 20.

The network resource management server 20 performs setting management of each of the relay apparatuses in the L2 network and the L3 network, band reservation for a data stream to be multicast-transmitted, and the like in accordance with the instruction from the controller 12. The function and operation of this network resource management server 20 will be explained in detail hereinafter.

In the present embodiment, the reception apparatus 40 is configured to select and receive one of a plurality of data streams multicast-transmitted from the plurality of transmission apparatuses 30. Further, the reception apparatus 40 is configured to switch from one data stream to another data stream and receive it.

In the present embodiment, a group including a plurality of transmission apparatuses 30 which have been arbitrarily selected and a plurality of reception apparatuses 40 is also referred to as a "resource group". A resource group is, in other words, a combination of a list of transmission ends and a list of reception ends. Here, there may be a plurality of resource groups in one relay management system.

The entire configuration example of the relay management system according to the embodiment of the present disclosure has thus been described above, referring to FIG. 1. Subsequently, communication performed between respective elements in the relay management system according to the embodiment of the present disclosure will be described.

Figure 2:
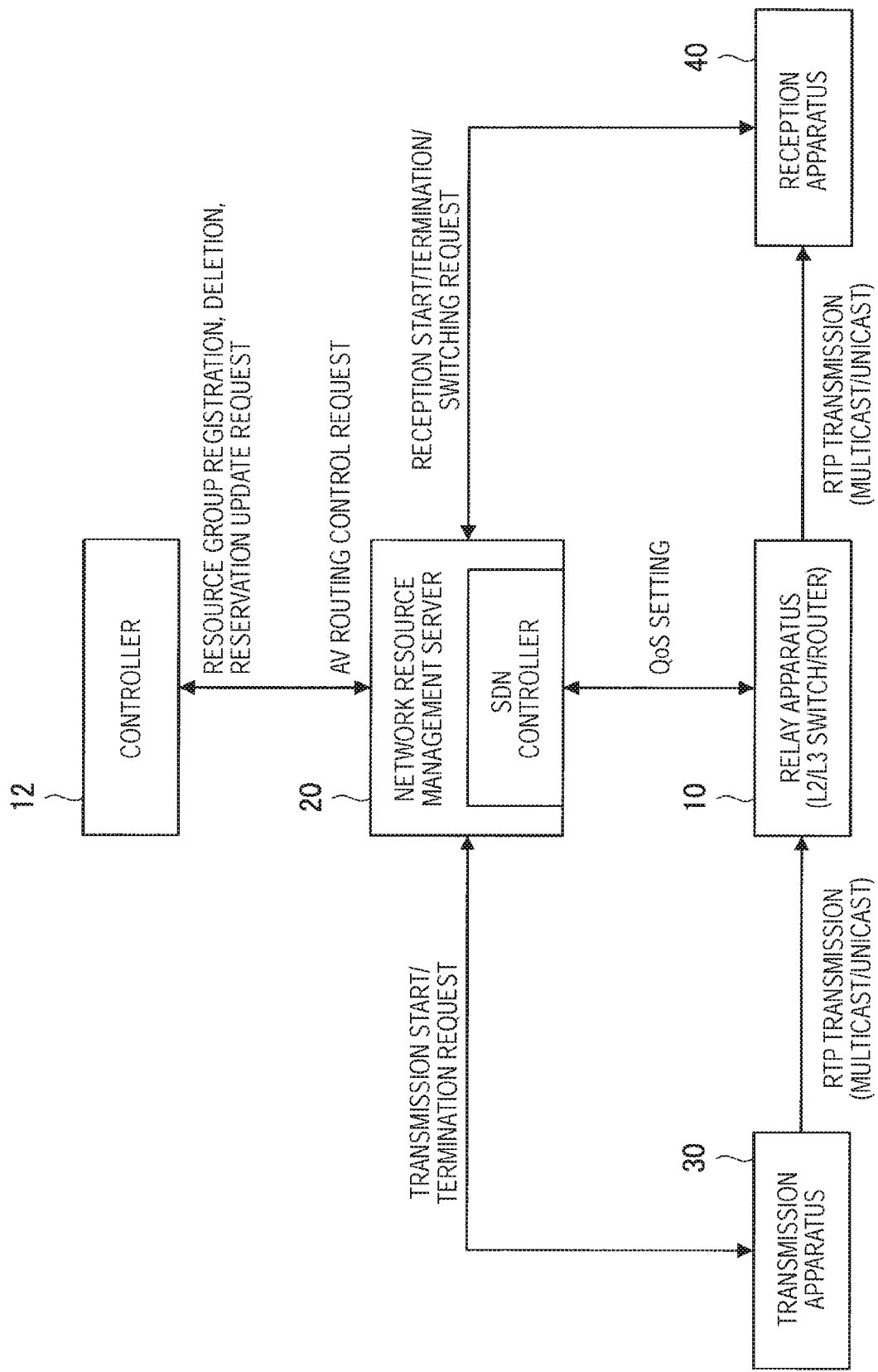
FIG. 2 is an explanatory diagram illustrating communication performed between elements in the relay management system.

FIG. 2 is an explanatory diagram illustrating communication performed between elements in the relay management system. The controller 12 and the network resource management server 20 are connected by an HTTP (Hyper Text Transfer Protocol) session, for example, and a "resource group registration, deletion, reservation update request" and an "AV routing control request" are transmitted from the controller 12 to the network resource management server 20.

Further, the network resource management server 20 and the transmission apparatus 30, and also the network resource management server 20 and the reception apparatus 40 are connected by WebSocket according to RFC6455, for example. The network resource management server 20 transmits a "multicast transmission start/termination request" or a "multicast reception start/termination/switching request" on the basis of the "multicast session start/termination request" from the controller 12.

The network resource management server 20 and the relay apparatus 10 are connected by a setting change IF such as the command line interface (CLI) via the ssh, telnet session, NETCONF according to RFC6241, and the OpenFlow protocol proposed by the Open Networking Foundation, for example. The network resource management server 20 performs Qos setting, multicast transfer, and the like to be described below on the relay apparatus 10.

The transmission apparatus 30 and the reception apparatus 40 perform the multicast transmission of the data steam (video, voice, or the like) using the RTP of the IP multicast according to RFC 3550, on the basis of reception of "multicast transmission start/termination request" or "multicast reception start/termination request" from the network resource management server 20. Note that requests may be transmitted and received by unicast instead of multicast when transmission between the transmission apparatus 30 and the reception apparatus 40 is performed on a one-to-one basis.

Communication performed between respective elements in the relay management system according to the embodiment of the present disclosure has thus been described above, referring to FIG. 2. Subsequently, a functional configuration example of the network resource management server 20 included in the relay management system according to the embodiment of the present disclosure will be described.

1.3. Configuration Example of Network Resource Management Server

Figure 3:
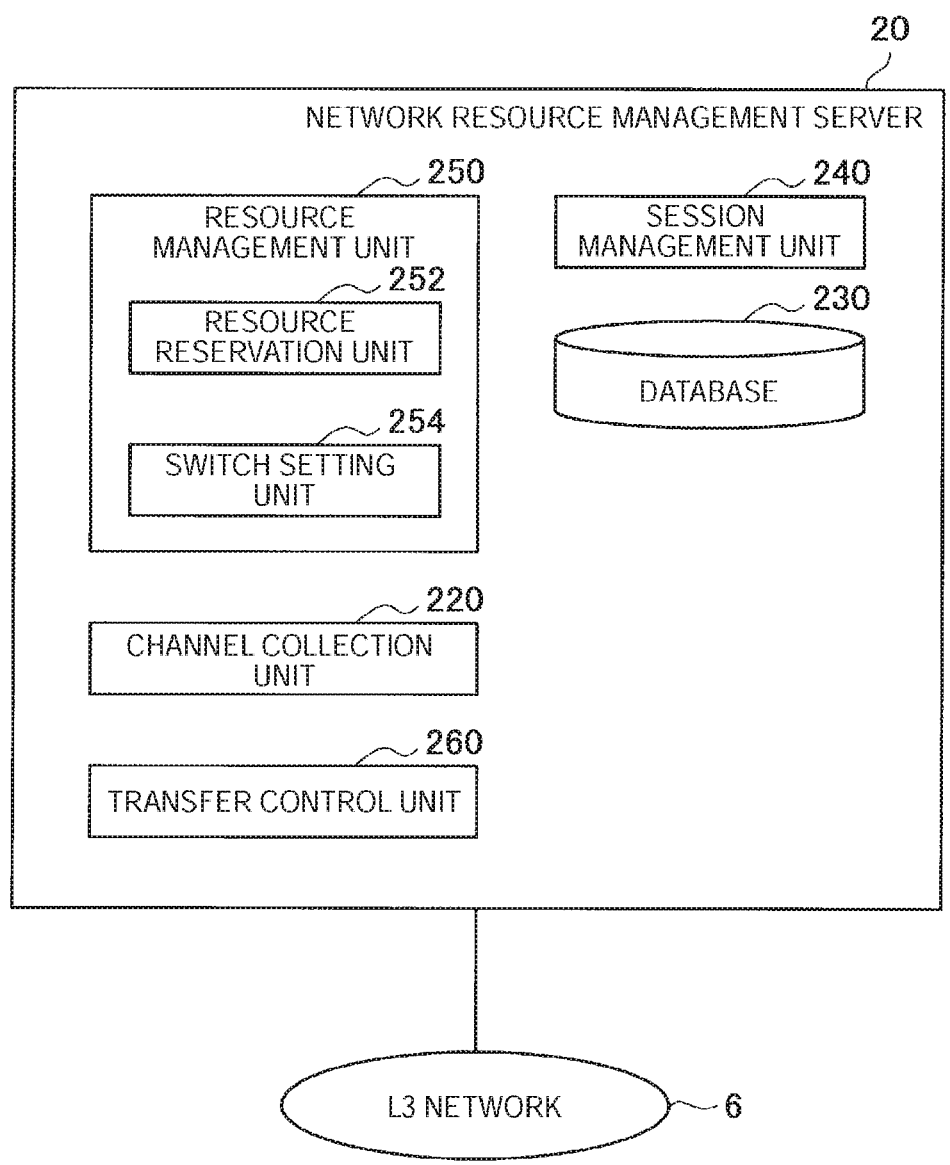
FIG. 3 is a functional block diagram illustrating a configuration of a network resource management server 20 according to the embodiment of the present disclosure.

FIG. 3 is a functional block diagram illustrating a configuration of the network resource management server 20 according to the embodiment of the present disclosure. In the following, a functional configuration example of the network resource management server 20 according to the embodiment of the present disclosure will be described, referring to FIG. 3.

As illustrated in FIG. 3, the network resource management server 20 according to the present embodiment includes a channel collection unit 220, a database 230, a session management unit 240, a resource management unit 250, and a transfer control unit 260.

The channel collection unit 220 collects physical topology (device connection) information of the L2 network and the L3 network, link information such as a band width of each of the relay links, and the like. For example, the channel collection unit 220 collects multicast channel information as described above on the basis of the link layer discovery protocol (LLDP) which is standardized by IEEE 802.1ab.

The database 230 stores various kinds of data used by the network resource management server 20. For example, the database 230 includes the information collected by the channel collection unit 220, session information registered by the session management unit 240 to be described below, and the like.

The session management unit 240 performs registration and deletion management of session information for the multicast transmission of a data stream, in accordance with an instruction from the controller 12. Here, the session management unit 240 according to the present embodiment separately registers or deletes the session information on the side of the transmission apparatus 30 and the session information on the side of the reception apparatus 40. With such a configuration, it becomes possible to flexibly handle the change of the transmission apparatus or the reception apparatus which participate in the multicast transmission. Note that the session information includes a group of a plurality of data streams (RTP multicast stream or the like), and the information of the transmission apparatus 30 and the reception apparatus 40.

The resource management unit 250 performs band reservation of a relay link at the transmission apparatus side or band reservation of a relay link at the reception apparatus side, on the basis of registration of the session information at the transmission apparatus 30 side or the reception apparatus 40 side by the session management unit 240. Band management by the resource management unit 250 will be described in detail below.

The transfer control unit 260 controls transfer setting of each relay apparatus 10. Transfer setting by the transfer control unit 260 is performed in initial setting prior to registration of the session information, in registration of the session information, in registration deletion of the session information, and the like. Transfer setting performed at each stage will be described in detail below.

In addition, as illustrated in FIG. 3, the resource management unit 250 is configured to include a resource reservation unit 252 and a switch setting unit 254.

The resource reservation unit 252 reserves transmission bands of data streams transmitted between the transmission apparatus 30 and the reception apparatus 40, on the basis of the information collected by the channel collection unit 220. The resource reservation unit 252 calculates the maximum traffic generated in all the switching patterns that may occur between the transmission apparatuses 30 and the reception apparatuses 40 included in one resource group, and reserves transmission bands of data streams in accordance with the maximum traffic. In addition, the resource reservation unit 252 determines whether or not it is possible to reserve the bands newly specified by the controller 12, on the basis of already reserved bands. Therefore, the resource reservation unit 252 may function as an example of a traffic calculation unit and a transmission band reservation unit of the present disclosure.

As has been thus described, reserving by the resource reservation unit 252, transmission bands of data streams in accordance with the maximum traffic generated in all the switching patterns that may occur between the transmission apparatuses 30 and the reception apparatuses 40 prevents interruption of data reception when data streams are switched by the reception apparatus 40. In addition, reserving, by the resource reservation unit 252, transmission bands of data streams in accordance with the maximum traffic generated in all the switching patterns that may occur between the transmission apparatuses 30 and the reception apparatuses 40 allows efficient band reservation without affecting other traffic, for example, traffic in other resource groups.

Prior to reservation of transmission bands of data streams, the resource reservation unit 252 specifies a channel between the transmission apparatus 30 and the reception apparatus 40, and a channel between the transmission apparatus 30 and the L3 switch 8, on the basis of given switch setting information and network topology information. As a premise of specifying a channel by the resource reservation unit 252, it is desirable that PIM-SSM, IGMP Querier setting has been made to the L3 switch 3 for which Source Specific Multicast is assumed. In addition, it is desirable that IGMP Snooping setting has been made to all the switches. Routing of the L3 switch 8 is only static routing, whereby dynamic change of the channel is suppressed.

The switch setting information provided to the resource reservation unit 252 may include VLAN information and routing information (routing table) of the L3 switch 8.

The switch setting unit 254 controls QoS setting of each relay apparatus 10. The QoS setting of each relay apparatus 10 by the switch setting unit 254 is performed in initial setting prior to registration of the session information, in registration of the session information, in registration deletion of the session information, and the like. The QoS setting performed at each stage will be described in detail later.

The functional configuration example of the network resource management server 20 according to the embodiment of the present disclosure has thus been described above, referring to FIG. 3. Subsequently, a use case example of the relay management system according to the embodiment of the present disclosure will be described.

Figure 4:
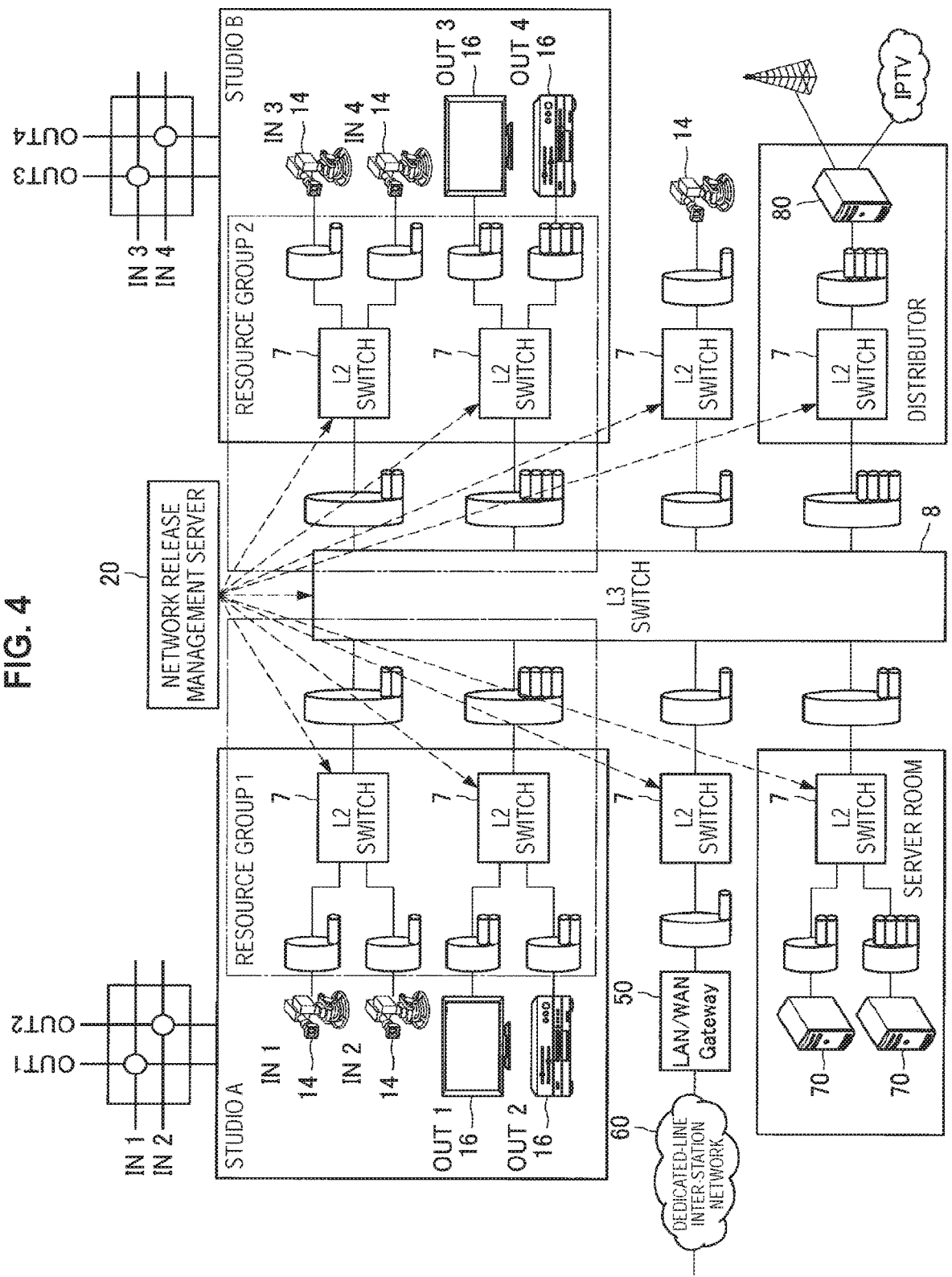
FIG. 4 is an explanatory diagram illustrating one of use case examples of the relay management system according to the embodiment of the present disclosure.
Figure 5:
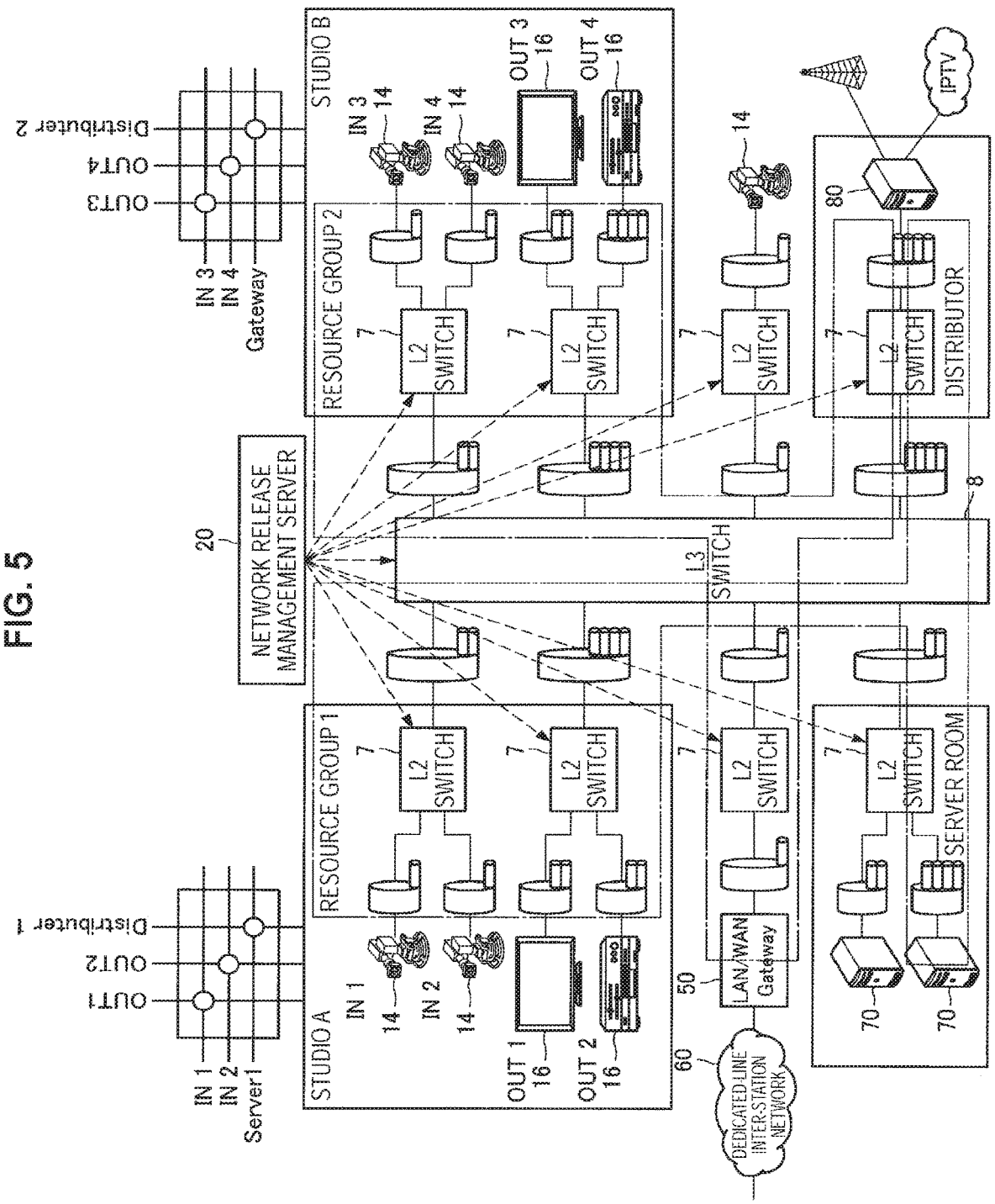
FIG. 5 is an explanatory diagram illustrating one of use case examples of the relay management system according to the embodiment of the present disclosure.
Figure 6:
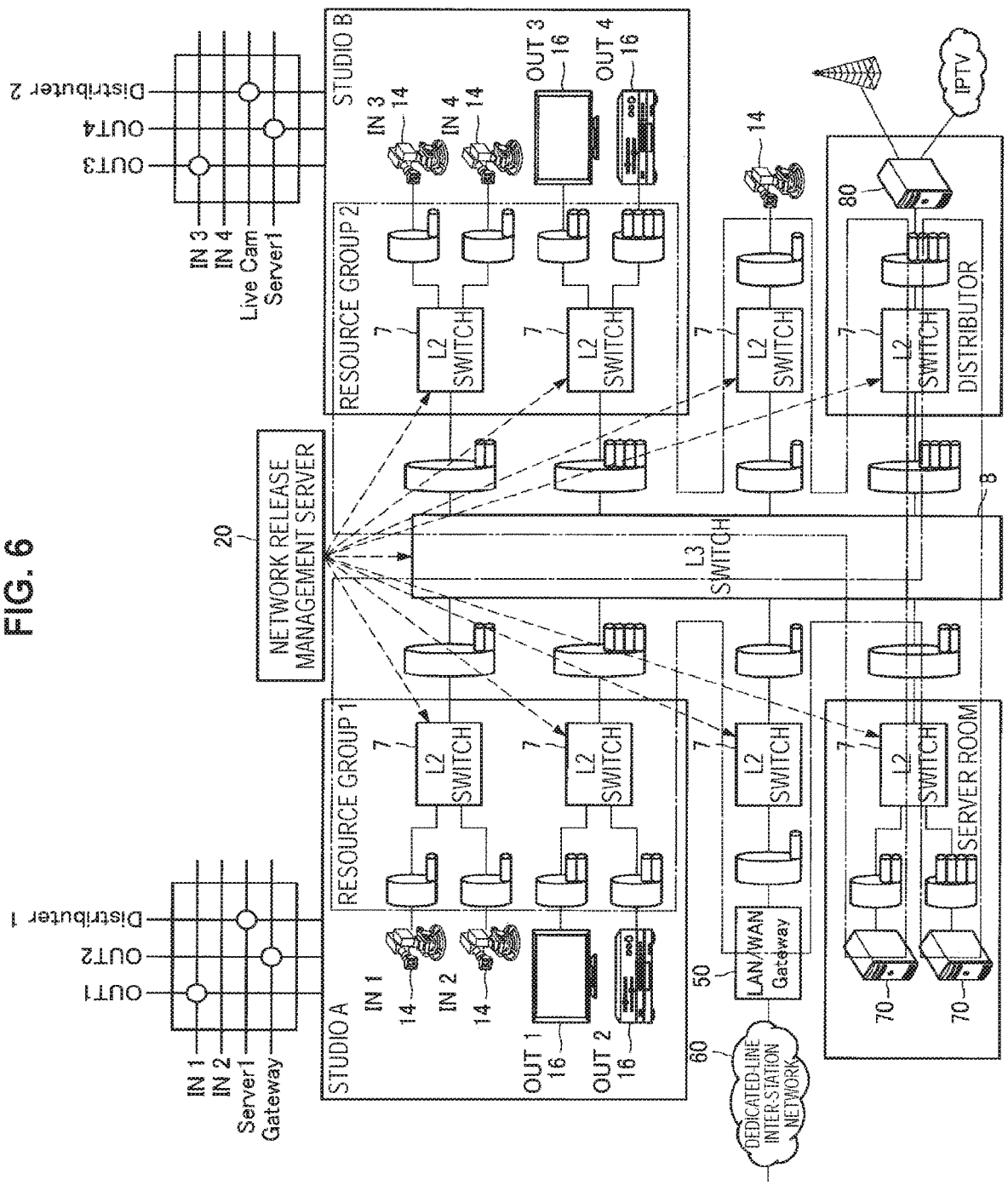
FIG. 6 is an explanatory diagram illustrating one of use case examples of the relay management system according to the embodiment of the present disclosure.

FIGS. 4 to 6 are explanatory diagrams illustrating one of use case examples of the relay management system according to the embodiment of the present disclosure. FIGS. 4 to 6 illustrate a use case example in which the relay management system according to the embodiment of the present disclosure is applied to the program production site in a broadcast station.

FIGS. 4 to 6 illustrate an example of a relay management system in which two studios A and B, a server room, a distributor for delivery of programs, an imaging apparatus 14 which is a weather-live camera for capturing images of the outside condition, and a LAN/WAN gateway 50 connected to a dedicated-line inter-station network 60 for communicating with other broadcast stations are connected via an IP network.

FIG. 4 illustrates an example of a case where the imaging apparatuses 14 and the display apparatuses 16 provided in the two studios A and B constitute resource groups 1 and 2, respectively. Each resource group may have set therein devices constituting a group by the network resource management server 20. In addition, each resource group may have the band thereof managed by the network resource management server 20.

There may be a case where bands of the network are required to be temporarily reserved in order to allow respective devices of the resource groups 1 and 2 to communicate with a device outside respective studios thereof. FIG. 5 illustrates an example of a state in which the configuration of the resource group 1 has been changed from the state of FIG. 4 in order to allow respective devices constituting the resource group 1 to communicate with a server device 70 in a server room, or communicate with a delivery server 80 of a distributor delivering programs. Similarly, FIG. 5 illustrates an example of a state in which the configuration of the resource group 2 has been changed from the state of FIG. 4 in order to allow respective devices constituting the resource group 2 to communicate with the LAN/WAN gateway 50 connected to the dedicated-line inter-station network 60.

Another example is illustrated. FIG. 6 illustrates an example of a state in which the configuration of the resource group 1 has been changed from the state of FIG. 4 in order to allow respective devices constituting the resource group 1 to communicate with the LAN/WAN gateway 50 connected to the dedicated-line inter-station network 60, communicate with the server device 70 in the server room, or communicate with the delivery server 80 of the distributor delivering programs. Similarly, FIG. 6 illustrates an example of a state in which the configuration of the resource group 1 has been changed from the state of FIG. 4 in order to allow communication with the imaging apparatus 14 which is the weather-live camera for capturing images of the outside condition, communication with the server device 70 in the server room, or communication with the delivery server 80 of the distributor delivering programs.

As has been thus described, the configuration of a resource group may be dynamically changed in accordance with the application. The network resource management server 20 manages the configuration of respective resource groups which may be dynamically changed in accordance with the application, as well as the band used by each resource group. In addition, the network resource management server 20 also manages QoS in conjunction with the band management of each resource group.

The use case example of the relay management system according to the embodiment of the present disclosure has thus been described above. Subsequently, an operation example of the relay management system according to the embodiment of the present disclosure will be described.

Figure 7:
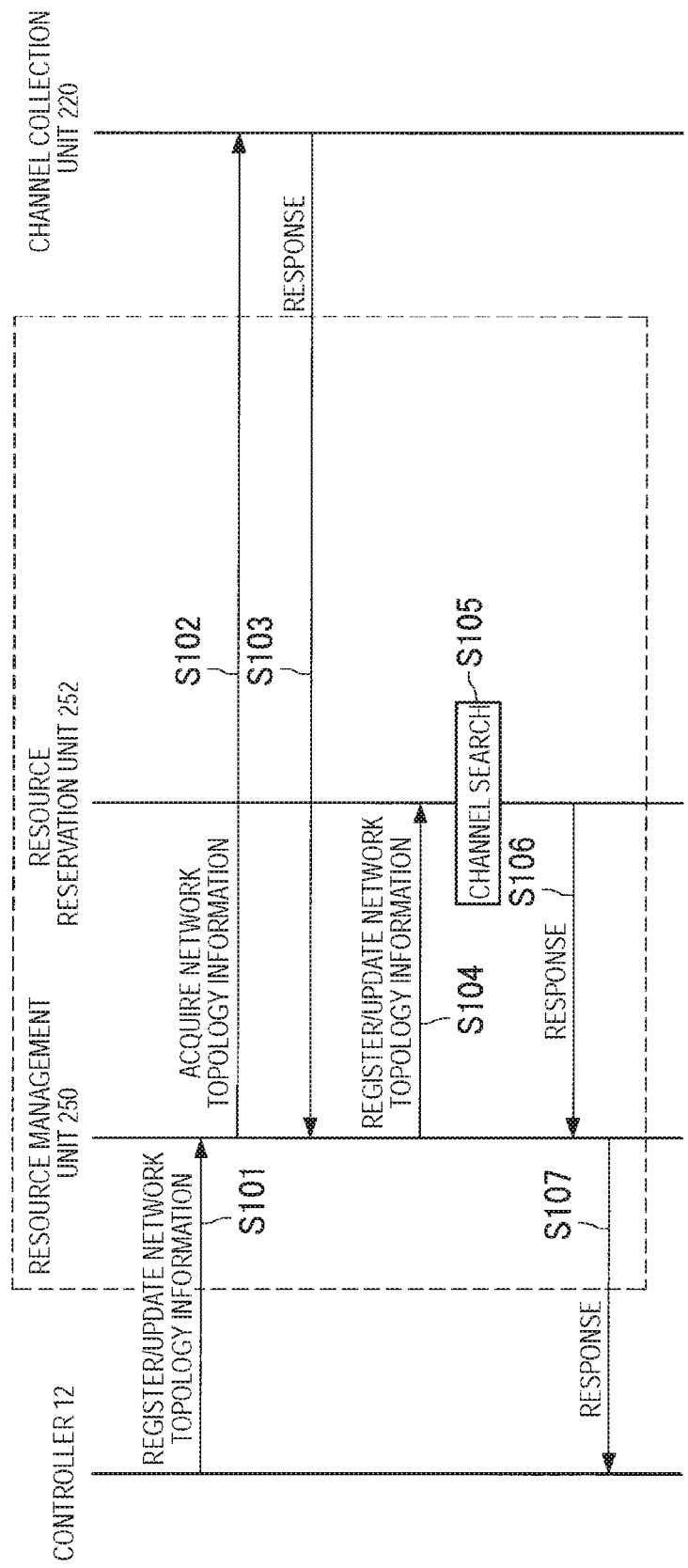
FIG. 7 is an explanatory diagram illustrating, with a sequence diagram, an operation example of the relay management system according to the embodiment of the present disclosure.

FIG. 7 is an explanatory diagram illustrating, with a sequence diagram, an operation example of the relay management system according to the embodiment of the present disclosure. FIG. 7 illustrates an operation example of the relay management system when the resource management unit 250, using the channel collection unit 220, searches for a channel between the transmission apparatus 30 and the reception apparatus 40 of a resource group whose bands are to be reserved, prior to band reservation of the network. In the following, the operation example of the relay management system according to the embodiment of the present disclosure will be described, referring to FIG. 7.

Here, prior to searching for the channel, it is desirable to perform, as preprocessing for example, construction of an IP network by a system manager, setting of an IP switch (preliminary setting other than the dynamic setting at the time of reservation), registration of network topology information to the database 230, topology registration to the relay apparatus 10, registration of various devices connected to the IP network (manual registration, or registration in conjunction with DHCP at the time of connection to the IP network).

When the process of searching for a channel between the transmission apparatus 30 and the reception apparatus 40 of a resource group whose bands are to be reserved is started from the controller 12, for example, the controller 12 instructs the network resource management server 20 to register/update the network topology information (Step S101).

The network resource management server 20, having received from the controller 12 at Step S101 described above the instruction to register/update the network topology information, causes the resource management unit 250 to acquire the network topology information collected by the channel collection unit 220 (Step S102). More specifically, the resource management unit 250 acquires, from the channel collection unit 220, the network topology information collected by the channel collection unit 220 and stored in the database 230.

The channel collection unit 220 responds to the resource management unit 250 with the network topology information collected by the channel collection unit 220, on the basis of an acquisition request of the network topology information from the resource management unit 250 (Step S103).

Upon receiving a response of the network topology information from the channel collection unit 220, the resource management unit 250 instructs the resource reservation unit 252 to register/update the network topology information (Step S104).

The resource reservation unit 252, having received from the resource management unit 250 the instruction to register/update the network topology information, searches for a channel between the transmission apparatus 30 and the reception apparatus 40 of a resource group whose bands are to be reserved, on the basis of the instruction from the resource management unit 250 (Step S105). Details of the channel search process at Step S105 will be described below.

Having performed the search for a channel between the transmission apparatus 30 and the reception apparatus 40 whose bands are to be reserved, the resource reservation unit 252 responds to the resource management unit 250 with the result of channel search between the transmission apparatus 30 and the reception apparatus 40 (Step S106). The resource management unit 250 then responds to the controller 12 with the result of channel search between the transmission apparatus 30 and the reception apparatus 40 (Step S107)

The network resource management server 20 is enabled, by the aforementioned series of processes, to acquire a channel between the transmission apparatus 30 and the reception apparatus 40 of a resource group whose bands are to be reserved.

Figure 8:
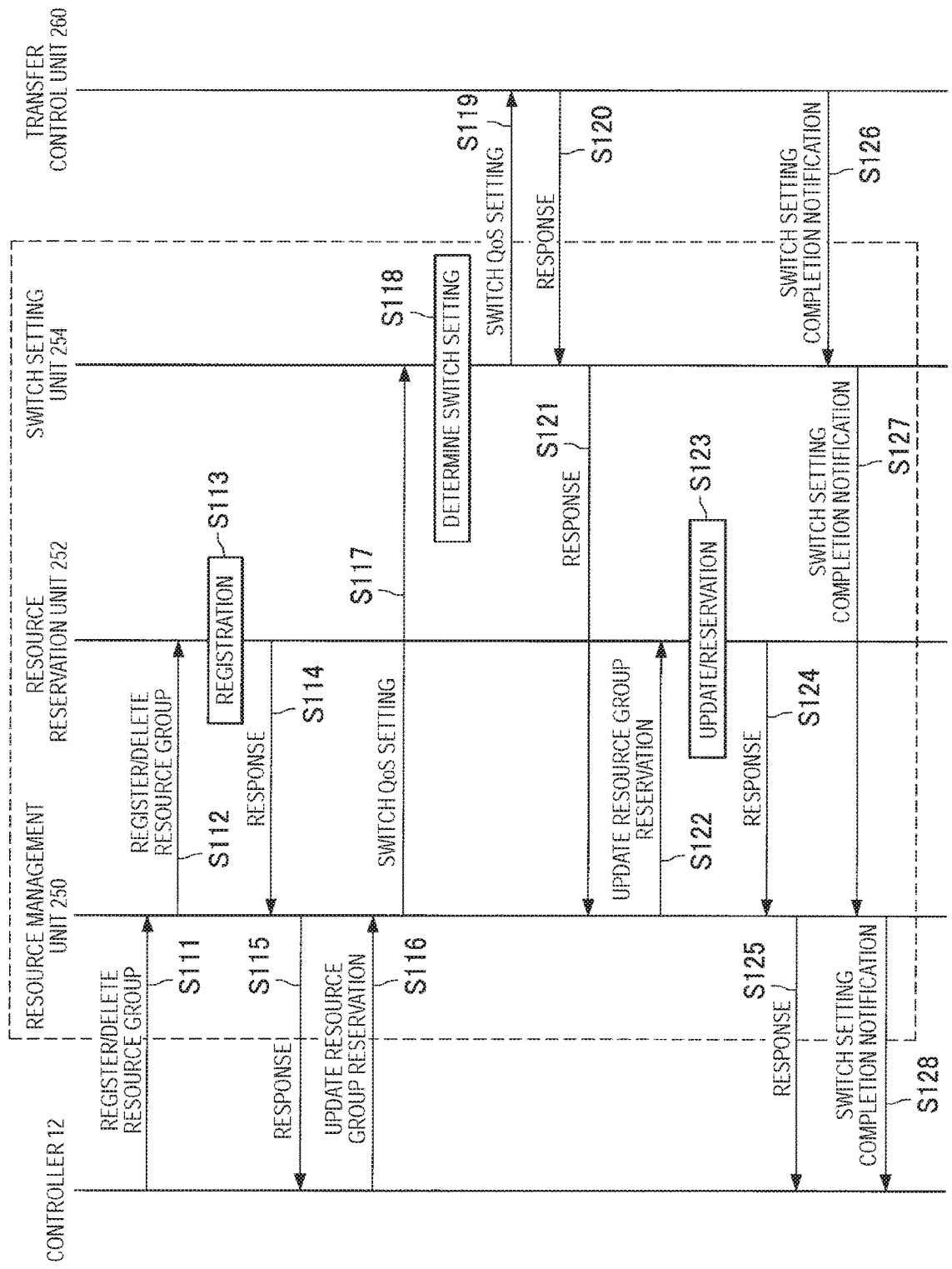
FIG. 8 is an explanatory diagram illustrating, with a sequence diagram, an operation example of the relay management system according to the embodiment of the present disclosure.

FIG. 8 is an explanatory diagram illustrating, with a sequence diagram, an operation example of the relay management system according to the embodiment of the present disclosure. FIG. 8 illustrates an operation example of the relay management system when the resource management unit 250 performs a band reservation process for the network in the resource group. In the following, the operation example of the relay management system according to the embodiment of the present disclosure will be described, referring to FIG. 8.

When registration/deletion of a resource group is first performed from the controller 12, for example, the controller 12 instructs the network resource management server 20 to register/delete the resource group (Step S111). The network resource management server 20, having received from the controller 12 the instruction to register/delete the resource group, causes the resource management unit 250 to instruct the resource reservation unit 252 to register/delete the resource group, on the basis of the instruction from the controller 12 (Step S112).

The resource reservation unit 252, having received the instruction to register/delete the resource group from the resource management unit 250, performs a registration/deletion process of a resource group on the basis of the instruction (Step S113). At Step S113, a pair of the transmission apparatus 30 and the reception apparatus 40 constituting the resource group are registered in the network resource management server 20.

Having performed registration/deletion of a resource group on the basis of the instruction from the resource management unit 250, the resource reservation unit 252 responds to the resource management unit 250 with the result (Step S114). Upon receiving, from the resource reservation unit 252, a response of the result of registration/deletion of the resource group, the resource management unit 250 responds to the controller 12 with the result of registration/deletion of the resource group (Step S115).

Subsequently, when updating (reservation update) of the band reservation of the resource group is performed from the controller 12, for example, the controller 12 instructs the network resource management server 20 to update the reservation of the resource group (Step S116).

The network resource management server 20, having received from the controller 12 the instruction to update the reservation of the resource group, causes the resource management unit 250 to instruct the switch setting unit 254 to perform switch QoS setting of the relay apparatus 10 (Step S117).

The switch setting unit 254 determines the switch QoS setting of the relay apparatus 10 on the basis of the instruction from the resource management unit 250 (Step S118) and instructs the transfer control unit 260 to perform switch QoS setting of the relay apparatus 10, based on the determination (Step S119).

Having performed the switch QoS setting of the relay apparatus 10 on the basis of the instruction from the switch setting unit 254, the transfer control unit 260 responds to the switch setting unit 254 with the result of setting (Step S120). The switch setting unit 254, having received the response from the transfer control unit 260, responds to the resource management unit 250 with the result of switch QoS setting of the relay apparatus 10 performed by the transfer control unit 260 (Step S121).

The resource management unit 250, having received from the switch setting unit 254 the result of switch QoS setting of the relay apparatus 10 performed by the transfer control unit 260, instructs the resource reservation unit 252 to update the reservation of the resource group, on the basis of the response (Step S122).

The resource reservation unit 252, having received from the resource management unit 250 the instruction to update the reservation of the resource group, updates the reservation of the resource group, on the basis of the instruction (Step S123). The resource reservation unit 252, having updated the reservation of the resource group, responds to the resource management unit 250 with the result of updating the reservation of the resource group (Step S124). The resource management unit 250, having received from the resource reservation unit 252 a response of the result of updating the reservation of the resource group, responds to the controller 12 with the result of updating the reservation of the resource group (Step S125).

Upon completion of switch QoS setting of the relay apparatus 10, the transfer control unit 260 sends a notification of completion of switch QoS setting of the relay apparatus 10 to the switch setting unit 254 (Step S126), in a manner parallel to the response of the result of updating the reservation of the resource group.

The switch setting unit 254, having received the notification of completion of switch QoS setting of the relay apparatus 10, sends a notification of completion of switch QoS setting of the relay apparatus 10 to the resource management unit 250 (Step S127) The resource management unit 250, having received the notification of completion of switch QoS setting of the relay apparatus 10, then sends the notification of completion of switch QoS setting of the relay apparatus 10 to the controller 12 (Step S128).

The relay management system according to the embodiment of the present disclosure can manage the configuration of each resource group which may be dynamically changed, and also manage the band used by each resource group, by performing the aforementioned series of operations. In addition, the relay management system according to the embodiment of the present disclosure can also process the QoS setting in a conjunctive manner, as well as managing the configuration of each resource group, by performing the aforementioned series of operations.

Details of the operation of the relay management system according to the aforementioned embodiment of the present disclosure will be described below. First, details of the channel search process at Step S105 of FIG. 7 will be described.

Figure 9:
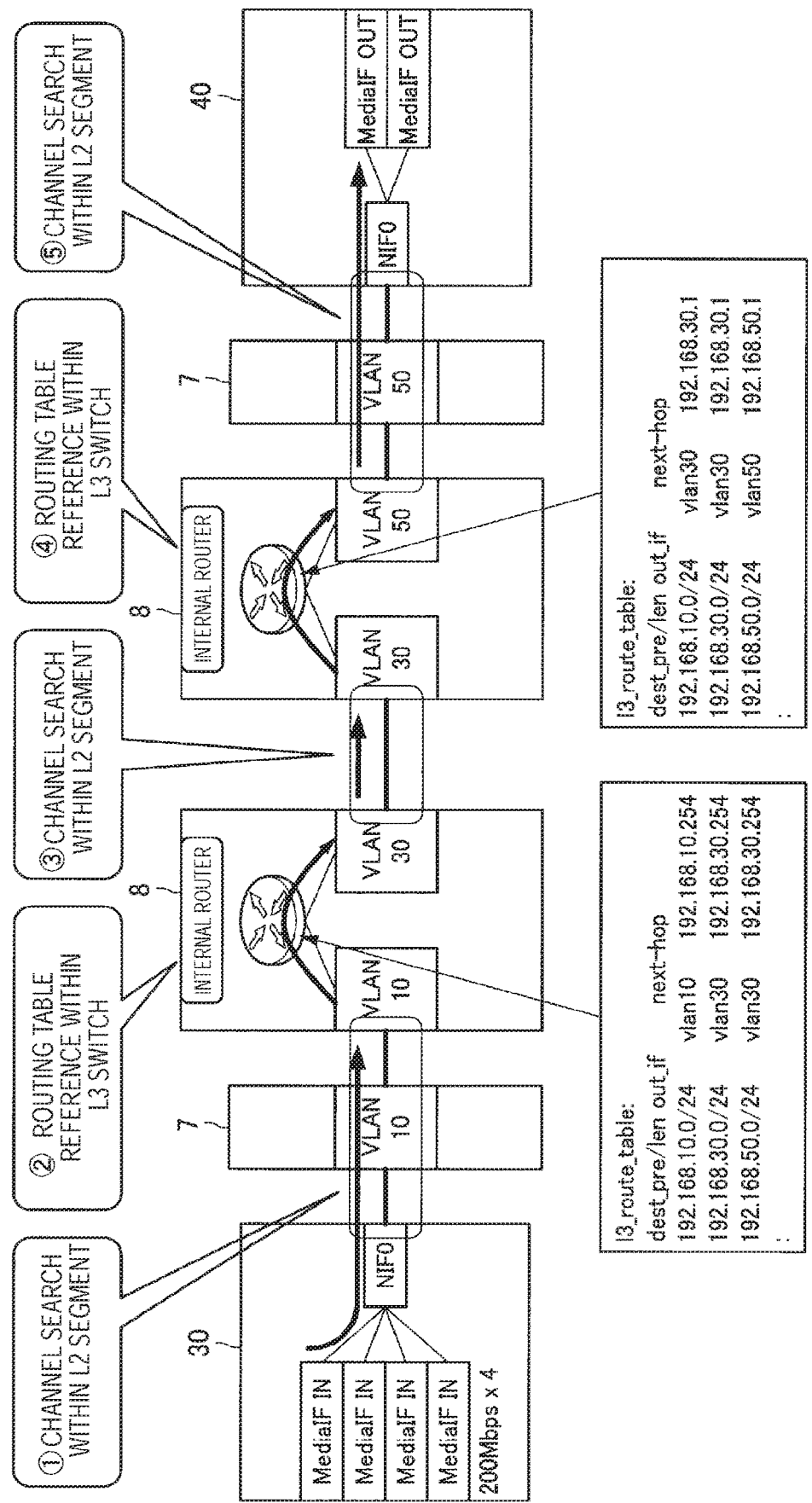
FIG. 9 is an explanatory diagram illustrating details of a channel search process of the relay management system according to the embodiment of the present disclosure.

FIG. 9 is an explanatory diagram illustrating details of the channel search process performed by the relay management system according to the embodiment of the present disclosure. In the following, details of the channel search process performed by the relay management system according to the embodiment of the present disclosure will be described, referring to FIG. 9.

A basic algorithm of the channel search process is a process of repeating, between an arbitrary transmission apparatus and a reception apparatus, a channel search within an L2 segment and a reference to the routing table in an L3 switch. Note that the terminals for transmitting and receiving session data to and from an IP network in the transmission apparatus and the reception apparatus are defined as MediaIFs. Therefore, the basic algorithm of the channel search process can be expressed, in other words, as a process of repeating a channel search within the L2 segment and a reference to the routing table in the L3 switch between the MediaIF (MediaIF IN) of the transmission apparatus and the MediaIF (MediaIF OUT) of the reception apparatus.

The channel search within the L2 segment is a process of searching for a channel to a Next-Hop (an L3 switch in a direction toward the reception apparatus or of destination) within the same L2 segment. The channel search process is completed when there exists a reception apparatus within the same L2 segment. An L2 segment has a tree-type topology, and therefore it is possible to uniquely determine a channel to the Next-Hop within the same L2 segment.

Reference to the routing table in the L3 switch is a process of determining an output port by referring to the routing table. FIG. 9 illustrates an example of a routing table of an internal router of two L3 switches, and a channel can be determined by acquiring an output port corresponding to the destination from the routing table.

Then, an output interface list on the searched channel is held as channel information between the transmission apparatus and the reception apparatus. The channel information is used in a reservation process of a resource group. In the present embodiment, the channel search process as described above may be performed by the channel collection unit 220, for example.

Subsequently, details of the reservation process of a resource group of the relay management system according to the embodiment of the present disclosure will be described. The reservation process of the resource group of the relay management system according to the embodiment of the present disclosure is a process of preliminarily reserving bands in accordance with the maximum traffic that may be generated in switching of AV routings within the resource group. In the present embodiment, the band reservation process as described above may be performed by the resource management unit 250, particularly the resource reservation unit 252.

The purpose of preliminarily reserving bands as described above is to prevent the risk of band shortage at the time of switching, by securing bands for the maximum traffic in switching of AV routings within the resource group. In addition, another purpose of preliminarily reserving bands as described above is for addressing the delay that may occur owing to a change of the switch setting when updating the band reservation.

First, definition of terms will be provided. When multicast transmission of data streams is performed from a transmission apparatus to a reception apparatus, the channel up to the first router (L3 switch) to be passed through is defined as Multicast Uplink, and the channel after the first router (L3 switch) to be passed through is defined as Multicast Downlink.

The basic algorithm of the reservation process of the resource group includes: channel search between all the MediaIFs within the resource group; band reservation for the maximum available band which may pass through ports of respective nodes (transmission apparatus, reception apparatus, switches); and calculation and reservation of available bands in accordance with both the Multicast Uplink and Downlink.

With regard to the Multicast Uplink, the network resource management server 20 performs band reservation for all the links (transmission ports) in the channel from the transmission MediaIF to the first router.

With regard to the Multicast Downlink, the network resource management server 20 generates a pair of a transmission MediaIF and a reception MediaIF of a session which may be passed through for each link (transmission port) of each node (switch) in a channel from the first router to the reception MediaIF, and performs reservation for the maximum available bands which may simultaneously occur.

Figure 10:
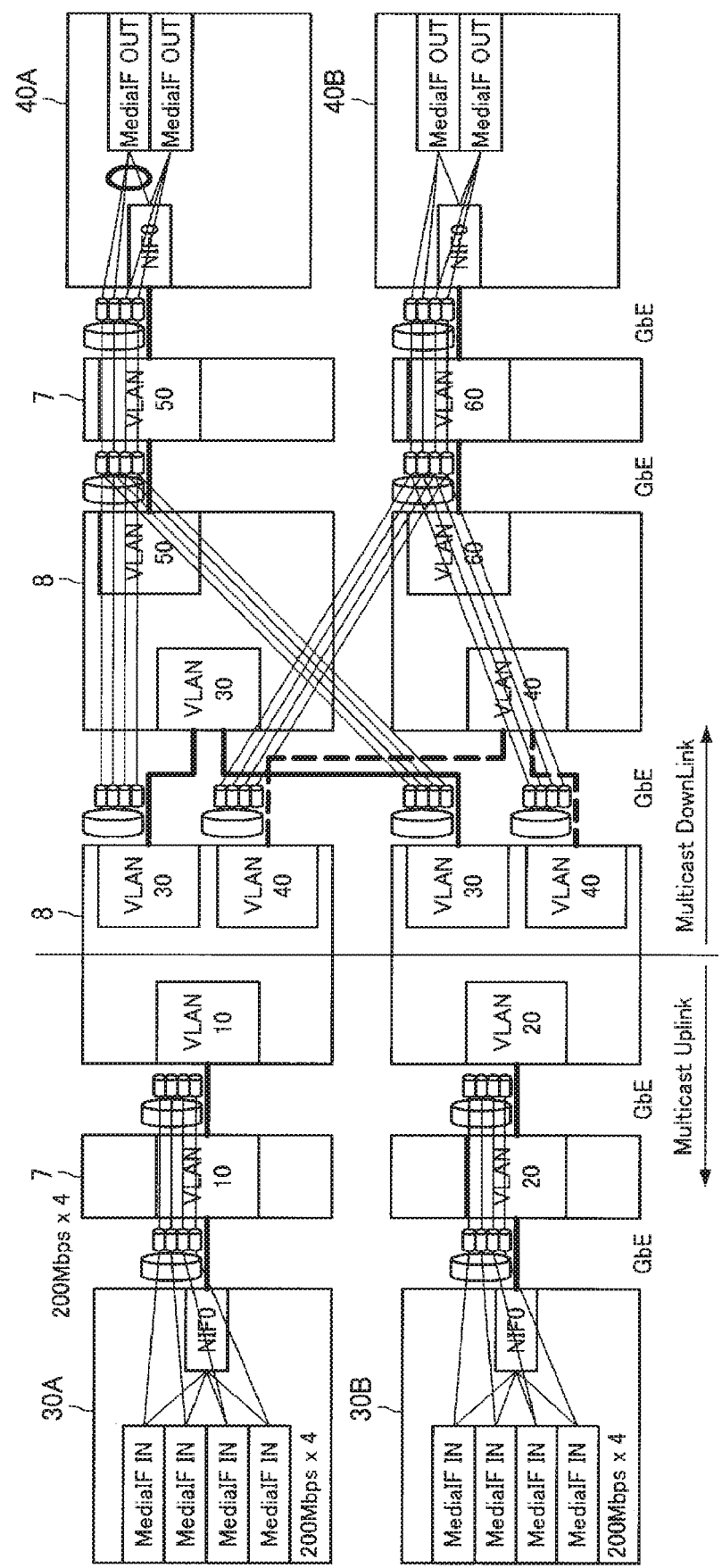
FIG. 10 is an explanatory diagram illustrating details of a reservation process of a resource group of the relay management system according to the embodiment of the present disclosure.

FIG. 10 is an explanatory diagram illustrating details of the reservation process of the resource group of the relay management system according to the embodiment of the present disclosure. The reservation process of the resource group will be described, referring to FIG. 10.

FIG. 10 illustrates an example of a case where the resource group includes the transmission apparatuses 30A and 30B as well as the reception apparatuses 40A and 40B, with data streams being transmitted from the transmission apparatuses 30A and 30B to the reception apparatuses 40A and 40B. In the network resource management server 20, the transmission apparatuses 30A and 30B are assumed to have four transmission MediaIFs, respectively, and transmit data streams with a transmission rate of 200 Mbps, respectively. In the example of FIG. 10, the Multicast Uplink ranges from the transmission apparatuses 30A and 30B up to the first L3 switch 8, and the Multicast Downlink ranges from the first L3 switch 8 up to the reception apparatuses 40A and 40B.

With regard to the Multicast Downlink, the network resource management server 20 may perform band reservation taking into account temporarily receiving two sessions simultaneously, in switching of data streams in the reception apparatus 40.

Figure 11:
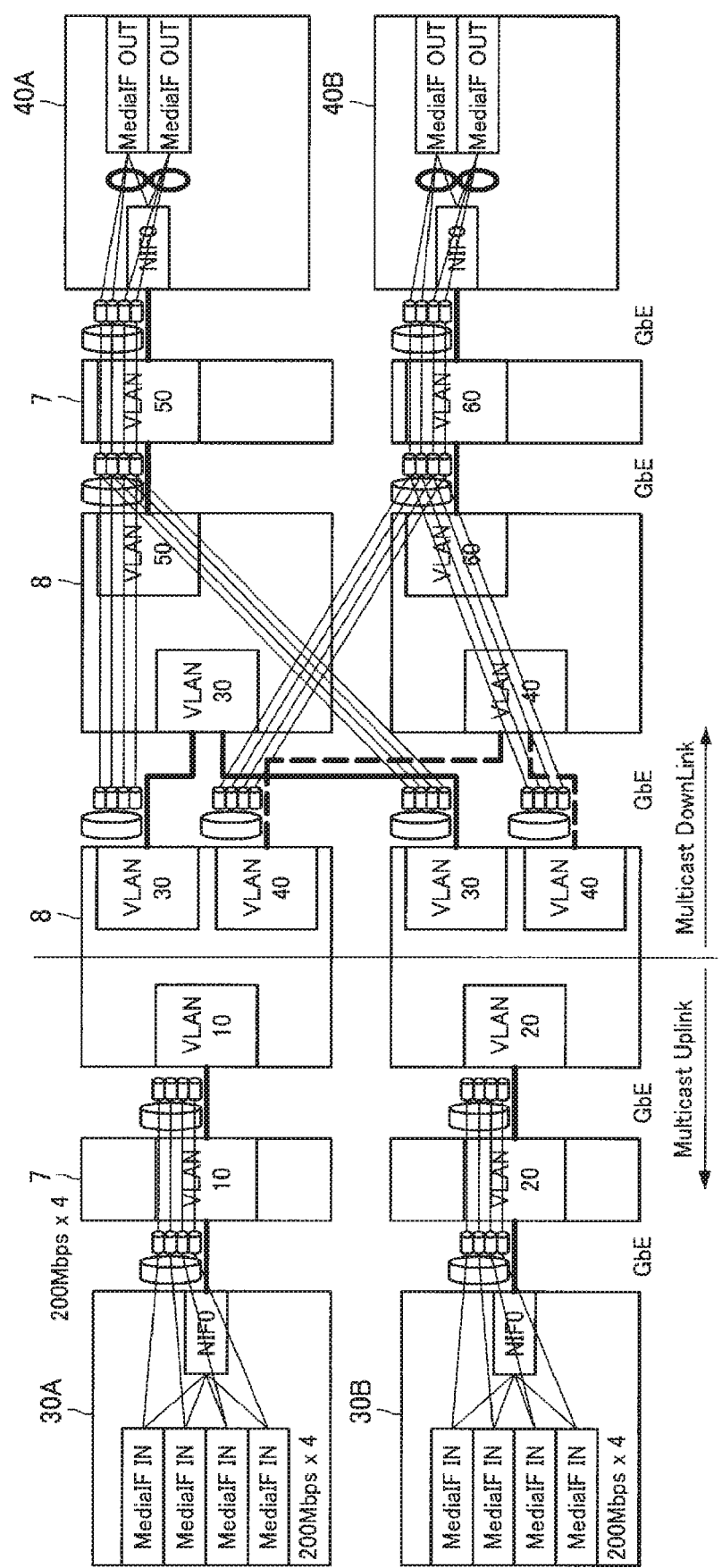
FIG. 11 is an explanatory diagram illustrating details of a reservation process of a resource group of the relay management system according to the embodiment of the present disclosure.

FIG. 11 is an explanatory diagram illustrating details of the reservation process of the resource group of the relay management system according to the embodiment of the present disclosure. The reservation process of the resource group will be described, referring to FIG. 11.

FIG. 11 illustrates an example of a case where band reservation is performed taking into account temporarily receiving two sessions simultaneously in respective MediaIFs of the reception apparatuses 40A and 40B. Note that it is not always necessarily to perform band reservation taking into account receiving two sessions simultaneously, and whether or not to perform band reservation taking into account temporarily receiving two sessions simultaneously depends on the content of a mode described below.

Figure 12:
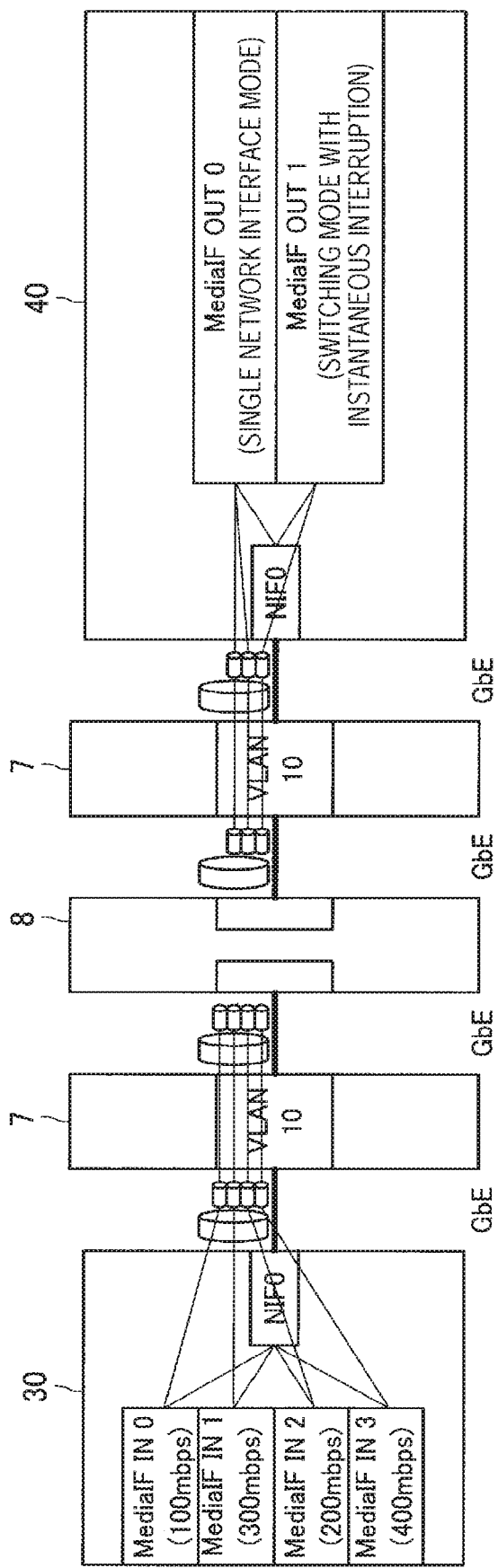
FIG. 12 is an explanatory diagram illustrating details of a reservation process of a resource group of the relay management system according to the embodiment of the present disclosure.

A band reservation procedure at the Multicast Downlink side by the network resource management server 20 will be described in detail. FIG. 12 is an explanatory diagram illustrating details of the reservation process of the resource group of the relay management system according to the embodiment of the present disclosure, i.e., an explanatory diagram illustrating the band reservation procedure at the Multicast Downlink side.

The network resource management server 20 first searches for a combination channel of all the transmission MediaIFs and reception MediaIFs included in the target resource group, and lists all the pairs of the transmission MediaIF and reception MediaIF through which a certain link may pass.

Subsequently, from among the listed pairs, the network resource management server 20 lists and selects pairs including a certain reception MediaIF. The network resource management server 20 then sorts the listed pairs including the certain reception MediaIF in descending order of transmission rate.

The example of FIG. 12 illustrates a case where the transmission rate of the transmission MediaIF (MediaIF IN) for MediaIF OUT 0 of one reception MediaIF is 100 Mbps, 300 Mbps, 200 Mbps and 400 Mbps. Therefore, sorting MediaIF IN in descending order of transmission rate results in a sequence of MediaIF IN 3, MediaIF IN 1, MediaIF IN 2 and MediaIF IN 0.

When band reservation taking into account receiving two sessions simultaneously is performed in the reception apparatus 40, the network resource management server 20 subsequently selects the top two out of the sorted transmission MediaIF, and marks the selected transmission MediaIF. The network resource management server 20 then adds the transmission band of the selected transmission MediaIF to the reserved band of the link.

In the example of FIG. 12, the network resource management server 20 selects two MediaIFs, namely MediaIF IN3 and MediaIF IN1. The reserved band at the time point turns out to be 400 Mbps+300 Mbps=700 Mbps.

Here, when band reservation without taking into account receiving two sessions simultaneously is performed in the reception apparatus 40, the network resource management server 20 selects the top one out of the sorted transmission MediaIF at this stage, and marks the selected transmission MediaIF.

From among the listed pairs, the network resource management server 20 subsequently lists and selects pairs including another reception MediaIF. The network resource management server 20 then sorts the listed pairs including a certain reception MediaIF in descending order of transmission rate. Thereafter, having performed a series of processes from sorting to addition to the reserved band, the network resource management server 20 subsequently selects another link in the target resource group this time, and performs the aforementioned series of processes again.

In the example of FIG. 12, sorting, by the network resource management server 20, MediaIF IN similarly in descending order of transmission rate for the MediaIF OUT 1 of the other reception MediaIF results in a sequence of MediaIF IN 3, MediaIF IN 1, MediaIF IN 2 and MediaIF IN 0.

Since the MediaIF OUT 1 is a mode without taking into account receiving two sessions (switching mode with instantaneous interruption), the top one MediaIF IN 2 out of unmarked transmission MediaIFs is selected, and the selected transmission MediaIF is marked. Therefore, the reserved band at the time point turns out to be 700 Mbps+200 Mbps=900 Mbps.

The network resource management server 20 performs the aforementioned sorting and marking processes for all the links.

In the example illustrated in FIG. 12, therefore, the network resource management server 20 reserves 900 Mbps as the maximum available band. In other words, 900 Mbps, which is the maximum band receivable by the reception MediaIF, is reserved instead of 1000 Mbps, which is the sum of all the transmission rates of the transmission MediaIF. The network resource management server 20 is able to perform efficient band reservation by reserving bands in the aforementioned manner. It goes without saying that there is no problem even if the bandwidth actually used in the resource group is smaller than the reserved bandwidth.

Figure 13:
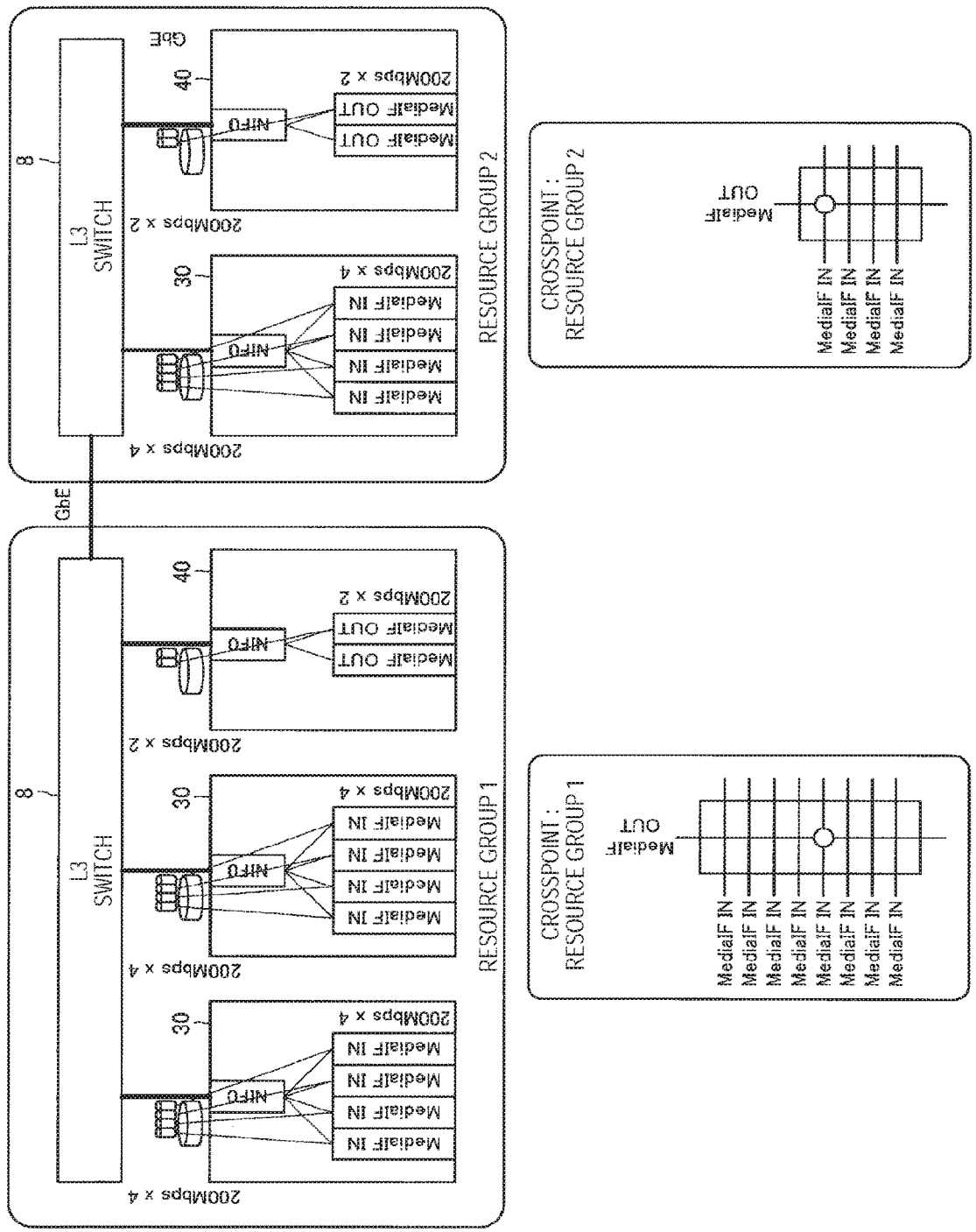
FIG. 13 is an explanatory diagram illustrating a state in which the network resource management server 20 performs band reservation for two resource groups.

The network resource management server 20 allows band reservation for a plurality of resource groups. FIG. 13 is an explanatory diagram illustrating a state in which the network resource management server 20 performs band reservation for two resource groups. FIG. 13 illustrates an example of managing bands respectively in a resource group 1 having eight inputs and one output, and a resource group 2 having four inputs and one output. The network resource management server 20 performs band reservation for each of the two resource groups, thereby allowing the relay management system according to the embodiment of the present disclosure to perform efficient band management.

Additionally, in the network configuration illustrated in FIG. 13, it is possible for the relay management system according to the embodiment of the present disclosure to prevent band overflow from occurring even if the bandwidth between the L3 switches 8 of respective resource groups is small, for example, by reserving bands separately between resource groups.

The network resource management server 20 according to the embodiment of the present disclosure can perform band reservation complying with both transmission with distributed data stream and transmission with multiplexed data stream. Details will be described below.

Figure 14:
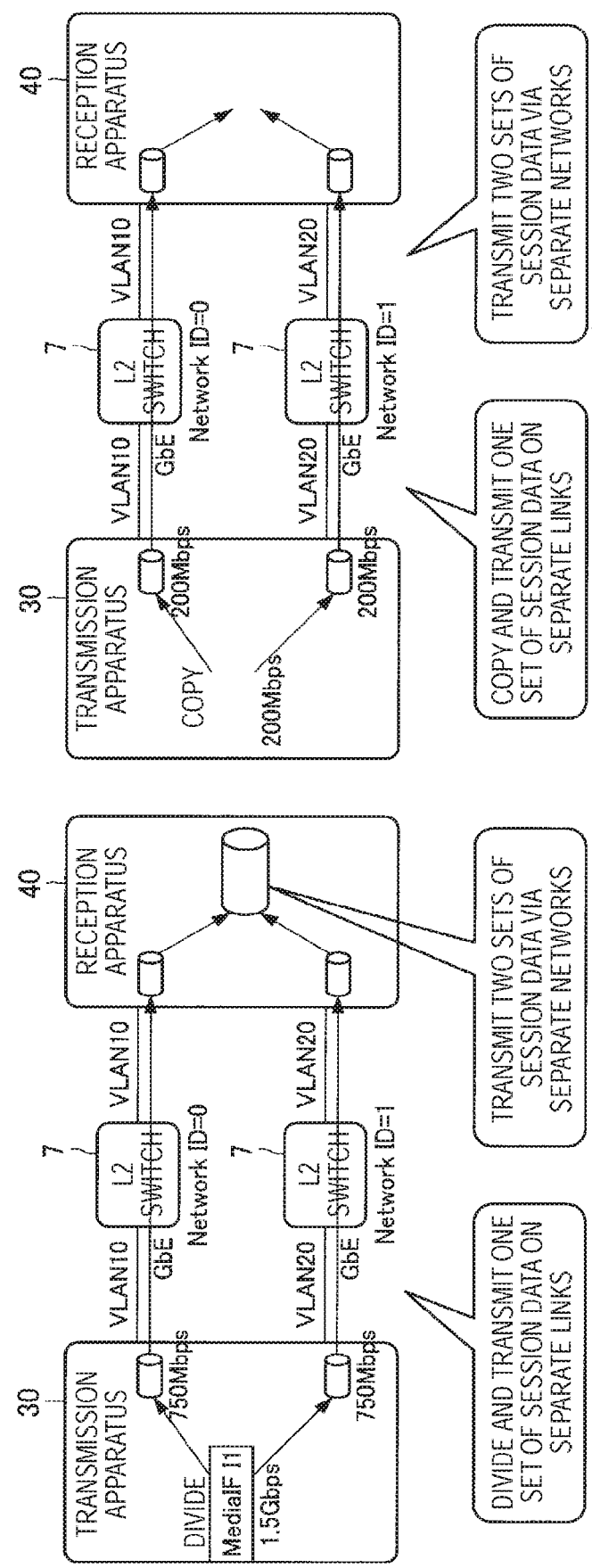
FIG. 14 is an explanatory diagram illustrating transmission with distributed data stream and transmission with multiplexed data stream.

FIG. 14 is an explanatory diagram illustrating transmission with distributed data stream and transmission with multiplexed data stream. Transmission with distributed data stream is also referred to as "stream load distributed transmission" in the present embodiment, and transmission with multiplexed data stream is also referred to as "hitless switching" in the present embodiment.

Stream load distributed transmission is a function of transmitting session data exceeding a single link speed in a manner divided into a plurality of links. For example, as illustrated in FIG. 14, it is a function used in a case of transmitting 1.5 Gbps session data on a 1 giga GbE (gigabit Ethernet).

Hitless switching, on the other hand, is a function of providing redundancy by transmitting one set of session data in a multiplexed manner on a plurality of links. For example, as illustrated in FIG. 14, one set of session data of 200 Mbps is copied and transmitted on separate links. The hitless switching transmits one set of session data in a multiplexed manner on a plurality of links to provide redundancy so as to allow switching without instantaneous interruption by switching to another link when, for example, a failure has occurred in one of the links.

Here, it is assumed that, in both the stream load distributed transmission and the hitless switching, the network on which a plurality of sets of session data is respectively transmitted is divided.

The network resource management server 20 then performs band reservation complying with both the stream load distributed transmission and the hitless switching.

FIG. 15A is an explanatory diagram illustrating band reservation by the network resource management server 20 in a case of the stream load distributed transmission. The stream load distributed transmission, which is a function of transmitting session data exceeding the single link speed in a manner divided into a plurality of links, reserves bands of half the transmission rate of the session data for respective networks. In the example illustrated in FIG. 15A, the network resource management server 20 performs band reservation at 100 Mbps respectively for two networks (the two networks of ID=0 and ID=1 illustrated in FIG. 15A) in order to transmit session data of 200 Mbps.

Figure 15B:
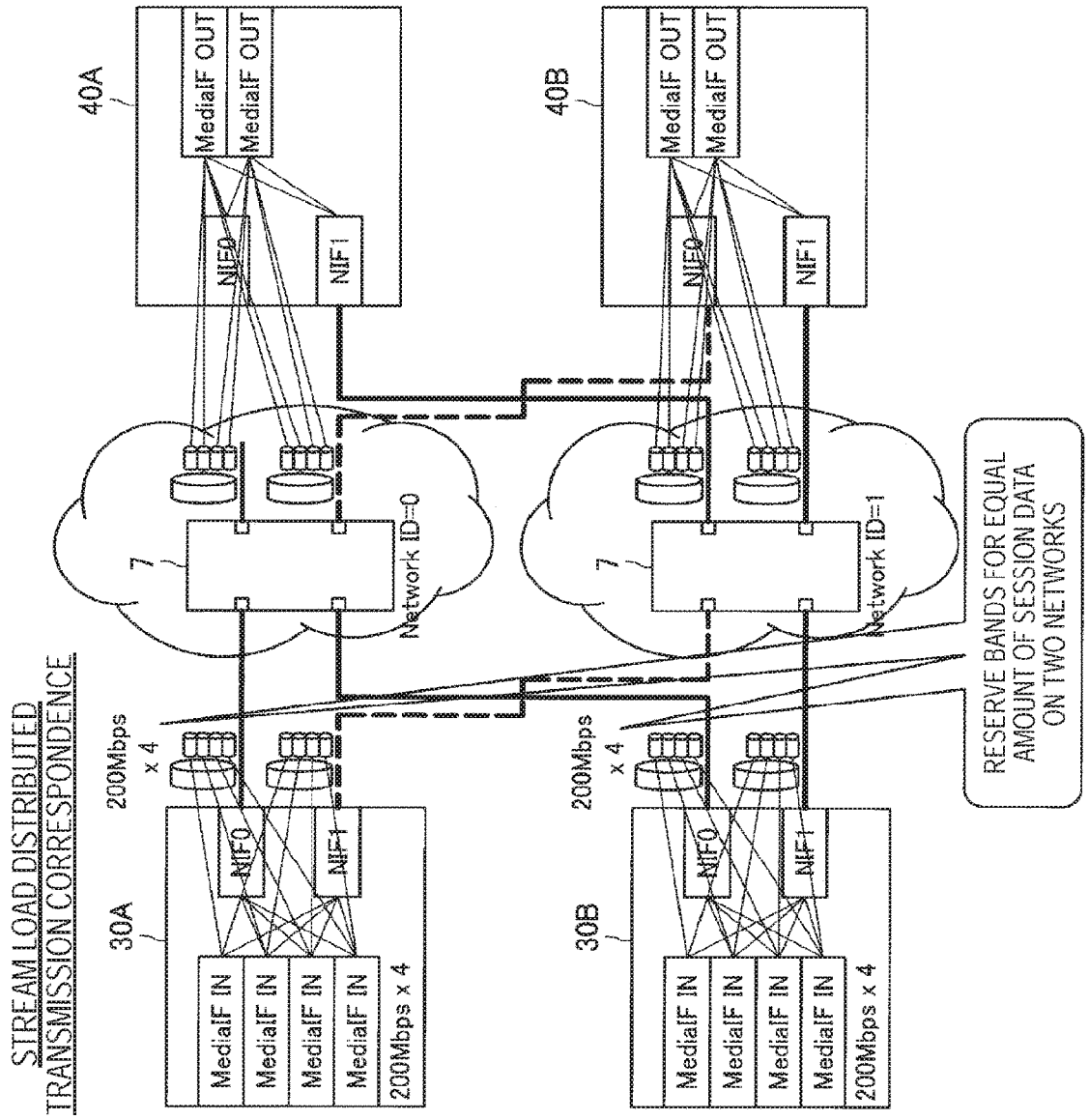
FIG. 15B is an explanatory diagram illustrating band reservation by the network resource management server 20 in a case of hitless switching.

FIG. 15B is an explanatory diagram illustrating band reservation by the network resource management server 20 in a case of the hitless switching. The hitless switching, which is a function of providing redundancy by transmitting one set of session data in a multiplexed manner on a plurality of links, reserves bands with a transmission rate equal to that of the session data for respective networks. In the example illustrated in FIG. 15B, the network resource management server 20 performs band reservation at 200 Mbps respectively for two networks (the two networks of ID=0 and ID=1 illustrated in FIG. 15A) in order to transmit session data of 200 Mbps.

Figure 16:
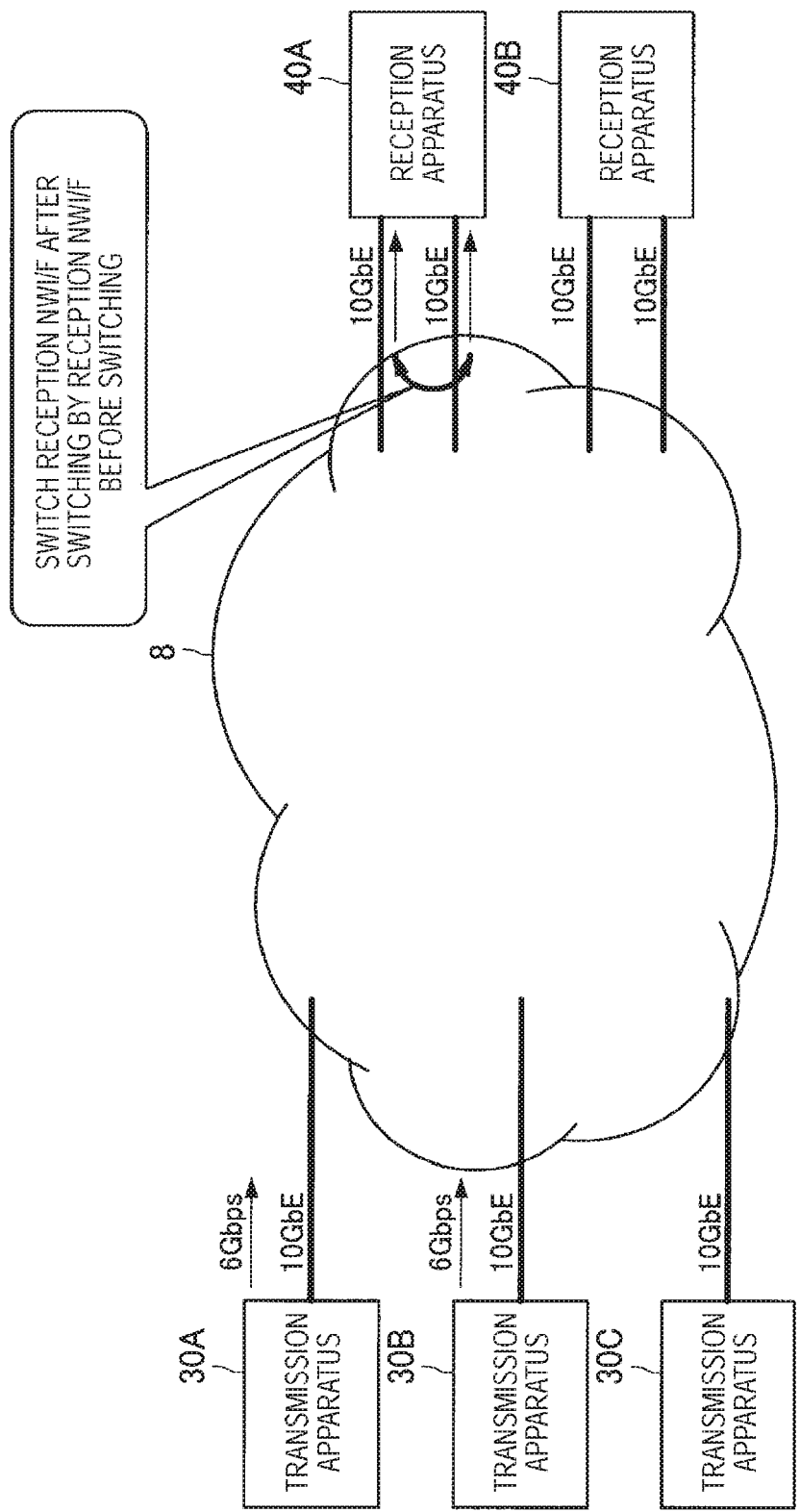
FIG. 16 is an explanatory diagram illustrating a relation example between a transmission rate and a link band.

In a case where the transmission rate of one session is greater than half the link band, it is impossible to receive two sessions from one network interface (IF). FIG. 16 is an explanatory diagram illustrating a relation example between a transmission rate and a link band, i.e., an explanatory diagram illustrating a case where the transmission rate of one session is greater than half the link band. FIG. 16 illustrates an example of a case where the transmission rate of one session is 6 Gbps and the link band is 10 Gbps.

In such a case, the reception apparatus 40 cannot receive two sessions from one network interface (IF) and therefore, when it is necessary to temporarily receive two sessions simultaneously by the reception apparatus 40, it is necessary to receive the sessions in a manner switching between a plurality of interfaces. In other words, there may be a case where the network resource management server 20 according to the embodiment of the present disclosure is required to perform band reservation complying with a so-called multi-home switching in the reception apparatus 40.

In order to comply with the multi-home switching, it is desirable to connect the two network IFs of the reception MediaIF to separate L2 segments. This is because connecting two network IFs of the reception MediaIF to the same L2 segment may make VLAN multiplexing unusable in part of inter-switch connection, and therefore is not recommended depending on the platform.

In addition, a configuration such that two network IFs of the reception MediaIF are reachable from the transmission MediaIF is desirable. In other words, it is desirable to consolidate two L2 segments of the reception MediaIF using the L3 switch.

Further, as resource management complying with the multi-home switching, the network resource management server 20 specifies a synchronized switching mode for each reception MediaIF, and changes the band reservation method for each of the modes. The following three modes are prepared in the present embodiment.

(1) Single-Home Clean Switching Mode

A mode in which the reception MediaIF holds only one network IF, and performs band reservation for two sessions.

(2) Multi-Home Clean Switching Mode

A mode in which the reception MediaIF holds two network IFs, and performs band reservation for one session for a channel via each network IF.

(3) Single-Home Switching Mode with Instantaneous Interruption

A mode in which it is not necessary to temporarily receive two sessions at the time of synchronized switching. A mode in which bands for one session are reserved for a channel via one network IF.

Figure 17:
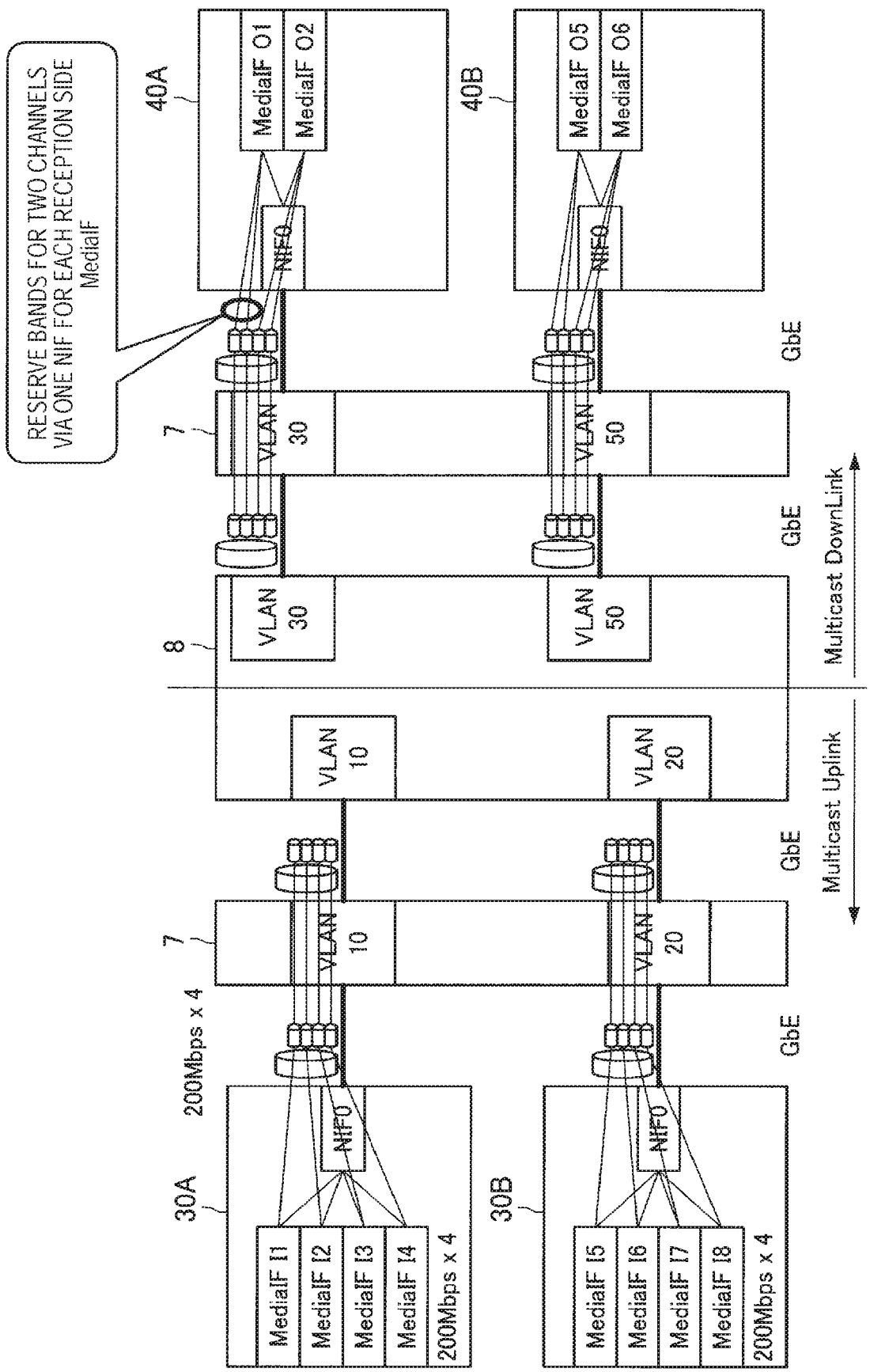
FIG. 17 is an explanatory diagram illustrating band reservation in a single-home clean switching mode.

FIG. 17 is an explanatory diagram illustrating band reservation in the single-home clean switching mode. In the single-home clean switching mode, the network resource management server 20 performs band reservation for two sessions for a channel via one network IF for synchronized switching for each reception MediaIF, in the Multicast Downlink part after the first L3 switch 8.

Figure 18:
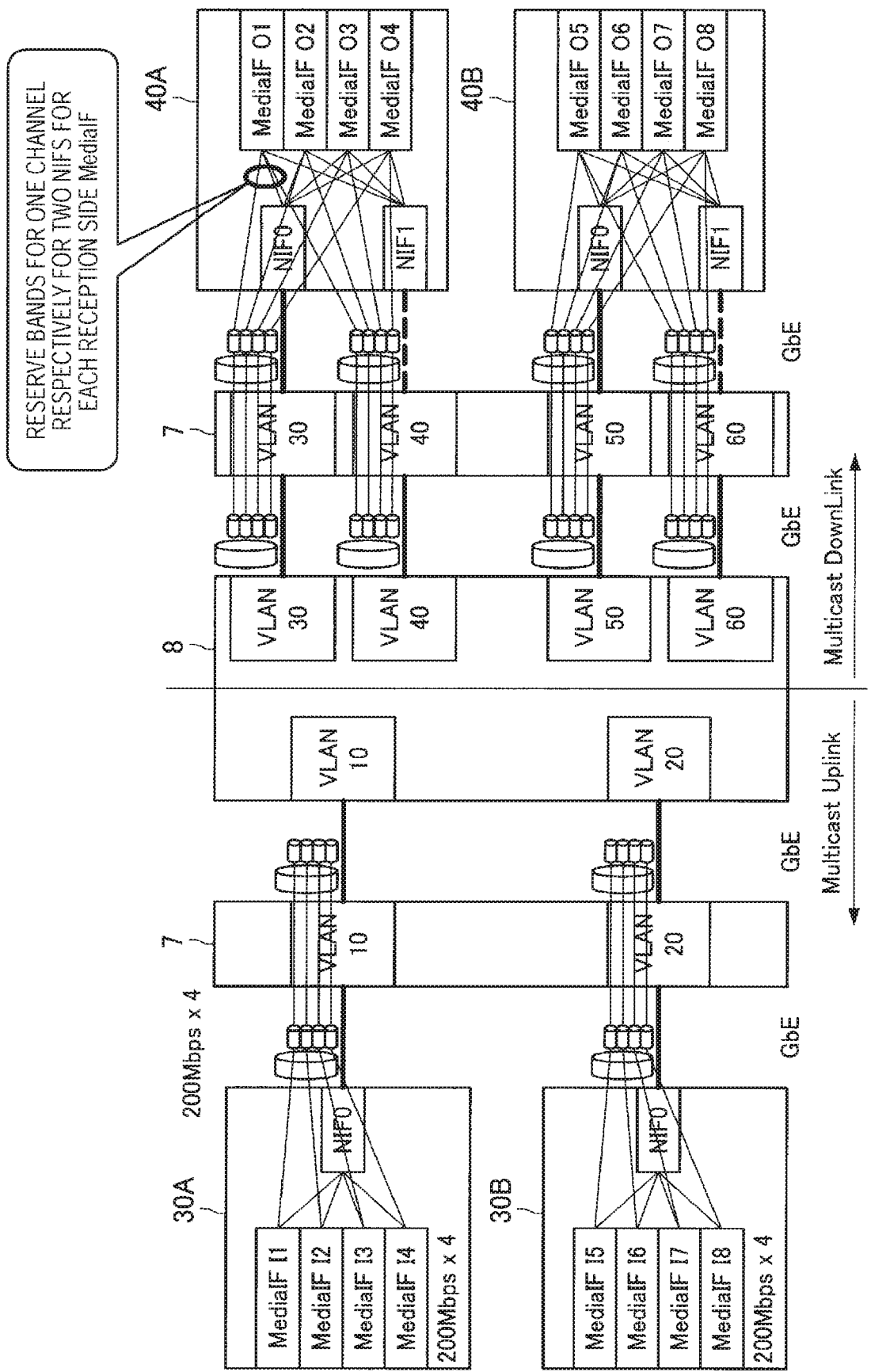
FIG. 18 is an explanatory diagram illustrating band reservation in a multi-home clean switching mode.

FIG. 18 is an explanatory diagram illustrating band reservation in the multi-home clean switching mode. In the multi-home clean switching mode, the network resource management server 20 performs band reservation for one session for each of the two network IFs for synchronized switching for each reception MediaIF, in the Multicast Downlink part after the first L3 switch 8.

Here, as a premise of the multi-home clean switching mode, AV routing performs, for each reception MediaIF, reception processes (IGMP Join transmission) alternately for two network IFs at the time of synchronized switching. In addition, it is also a premise of the multi-home clean switching mode that the receivable multicast source is reachable from both of the two network IFs.

Figure 19:
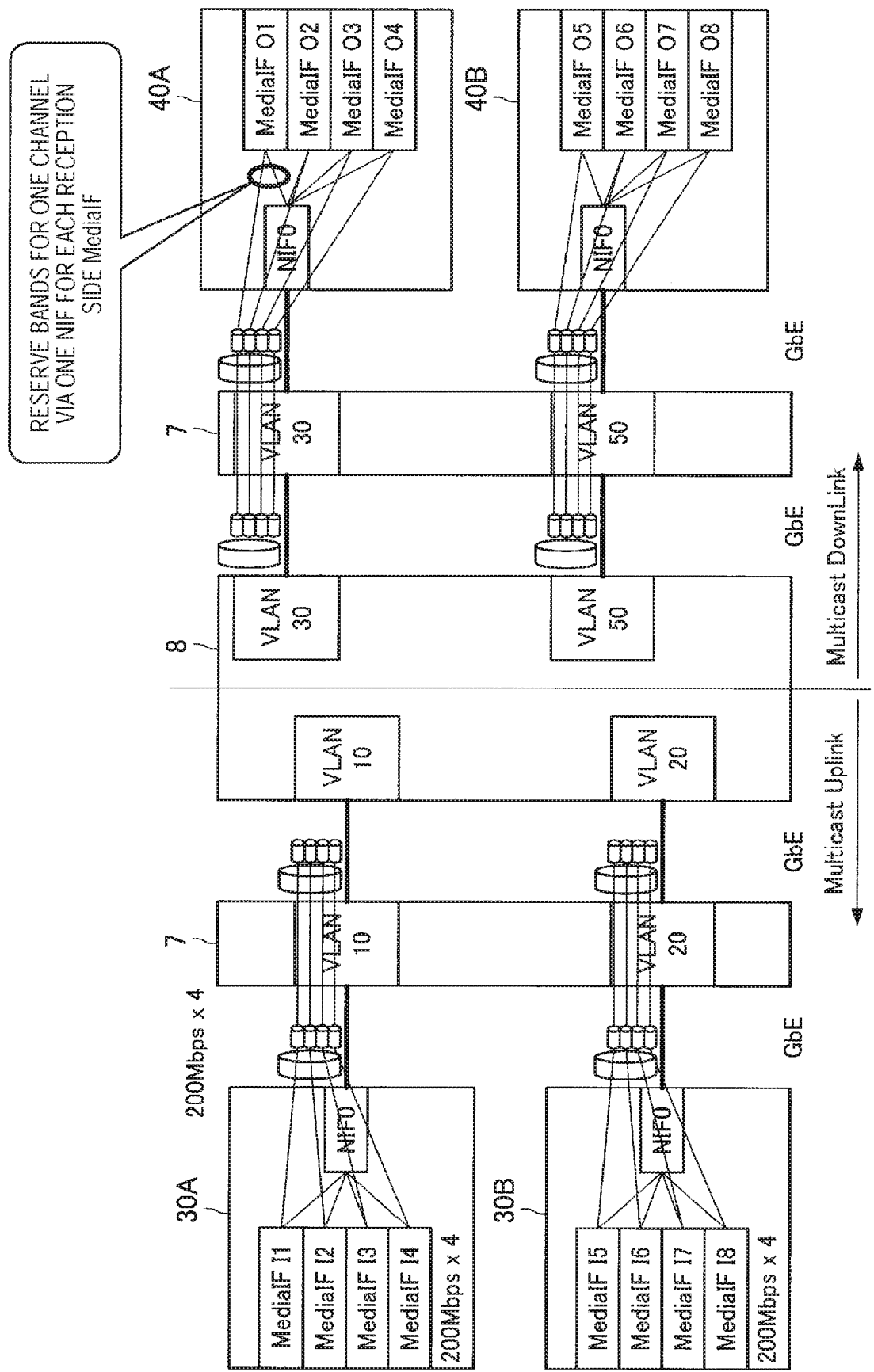
FIG. 19 is an explanatory diagram illustrating band reservation in a switching mode with single home instantaneous interruption.

FIG. 19 is an explanatory diagram illustrating band reservation in a single-home switching mode with instantaneous interruption. In the single-home switching mode with instantaneous interruption, the network resource management server 20 performs band reservation for one session for a channel via one network IF for synchronized switching for each reception MediaIF, in the Multicast Downlink part after the first L3 switch 8. In other words, at the time of switching sessions, the reception MediaIF side once disconnects (leaves) the session being received until then, and joins a new session.

Figure 20:
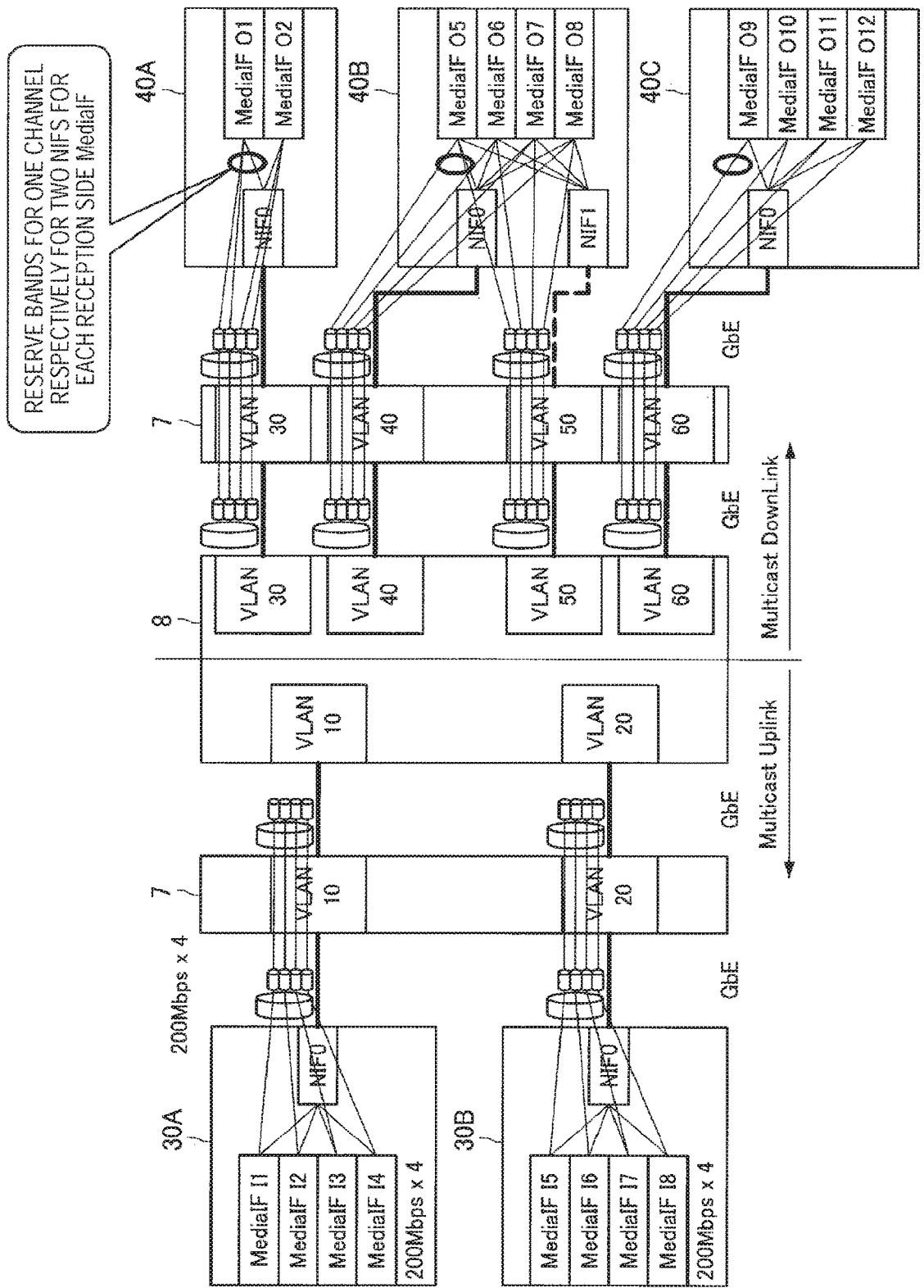
FIG. 20 is an explanatory diagram illustrating a configuration example of the relay management system according to the embodiment of the present disclosure.

It goes without saying that the aforementioned three modes may be used mixedly. FIG. 20 is an explanatory diagram illustrating a configuration example of the relay management system according to the embodiment of the present disclosure in a case where the aforementioned three modes are used mixedly. In a case where the aforementioned three modes are used mixedly as described above, the network resource management server 20 performs band reservation suitable for each mode.

Subsequently, QoS guarantee of the relay management system according to the embodiment of the present disclosure will be described. Here, definition of terms will be provided to describe the QoS guarantee of the relay management system according to the embodiment of the present disclosure.

A network included in the relay management system according to the embodiment of the present disclosure may also have connected thereto devices other than the devices related to transmission of AV streams. For example, transmission of files or the like by devices which are not related to transmission of AV streams may simultaneously occur. However, traffic due to devices which are not related to transmission of AV streams must not affect the traffic of devices related to transmission of AV streams.

In the present embodiment, therefore, setting of switches is performed in a manner dividing a VLAN to which an interface connected with devices related to AV routing belongs, and a VLAN to which an interface connected with devices not related to AV routing belongs. Setting switches in the aforementioned manner with VLANs being divided allows the relay management system according to the embodiment of the present disclosure to secure QoS of AV streams.

There exist authorized devices and out-of-management devices as devices connected to the relay management system according to the embodiment of the present disclosure.

An authorized device is a device registered by the network resource management server 20 and authorized to connect to the relay management system, i.e., a device connected to an interface belonging to an AV-VLAN. Note that the AV-VLAN is a VLAN to which an interface connected with devices related to AV routing belongs, such as devices and the network resource management server 20.

An out-of-management device is a device which is not managed by the network resource management server 20, i.e., a device connected to an interface belonging to a BE-VLAN. The BE-VLAN means a "best-effort VLAN", i.e., a VLAN to which an interface connected with the out-of-management device belongs.

Subsequently, setting of an edge switch for the authorized device and the out-of-management device will be described. Note that setting of the edge switch for the authorized device and the out-of-management device may be performed by, for example, the resource management unit 250, and particularly the switch setting unit 254. Furthermore, the edge switch refers to a switch to which each device is connected first or last, and generally the L2 switch turns out to be the edge switch.

Before being registered by the network resource management server 20, the authorized device has a BE filter and an IGMP filter set in a connection interface thereof. The BE filter is a filter having set therein a Classification for classifying all the traffic into the best effort class among priority classes described below.

In a state being registered by the network resource management server 20, the authorized device deletes, in a state with the device setting already established, the setting prior to the aforementioned registration to the connection interface, and sets Policer/Classification/Rewrite.

Note that the connection interface of the out-of-management device has the BE filter set therein by the network resource management server 20.

The relay management system according to the embodiment of the present disclosure, in conjunction with the reservation of the resource group, guarantees QoS of AV streams in the AV-VLAN by admission control at the edge switch.

Here, an example of Classification used in the relay management system according to the present embodiment is provided in Table 1. In the present embodiment, five priority classes, namely EF, AF41, AF31, AF21 and BF are provided. Further, in the present embodiment, QoS setting policy in each priority class, and traffic and messages transmitted in each priority class are defined as in Table 1. The classes in Table 1 are defined in descending order of priority.

TABLE 1

(List of Classification)

| priority class | QoS setting policy | traffic name message name |
|---|---|---|
| EF | traffic with a very small amount of permissible delay variation and a very large degree of influence on the system in case of loss/delay, and traffic with estimable maximum bandwidth | IEEE 1588 PTP message |
| AF41 | traffic with a small amount of permissible delay variation and possible disturbance of AV streams in case of loss/delay | AV stream |
| AF31 | traffic with a small amount of permissible delay variation and possible delay of start/stop/ switching of AV streams in case of loss/delay, and traffic with estimable maximum bandwidth | IGMP message device control traffic (start/stop of transmission and reception) PIM message ARP message traffic for controller |
| AF21 | traffic (including those for management) relating to service being operated in the system, and traffic with no influence on AV streams in case of loss/delay | |
| BE | other traffic traffic of yet-to-be-authorized devices traffic of out-of-management devices | traffic not corresponding to classes EF to AF21 |

Note that the aforementioned priority may be set as a DSCP (Differentiated Services Code Point) value to be stored in a ToS Field in an IP header, for example.

Figure 21:
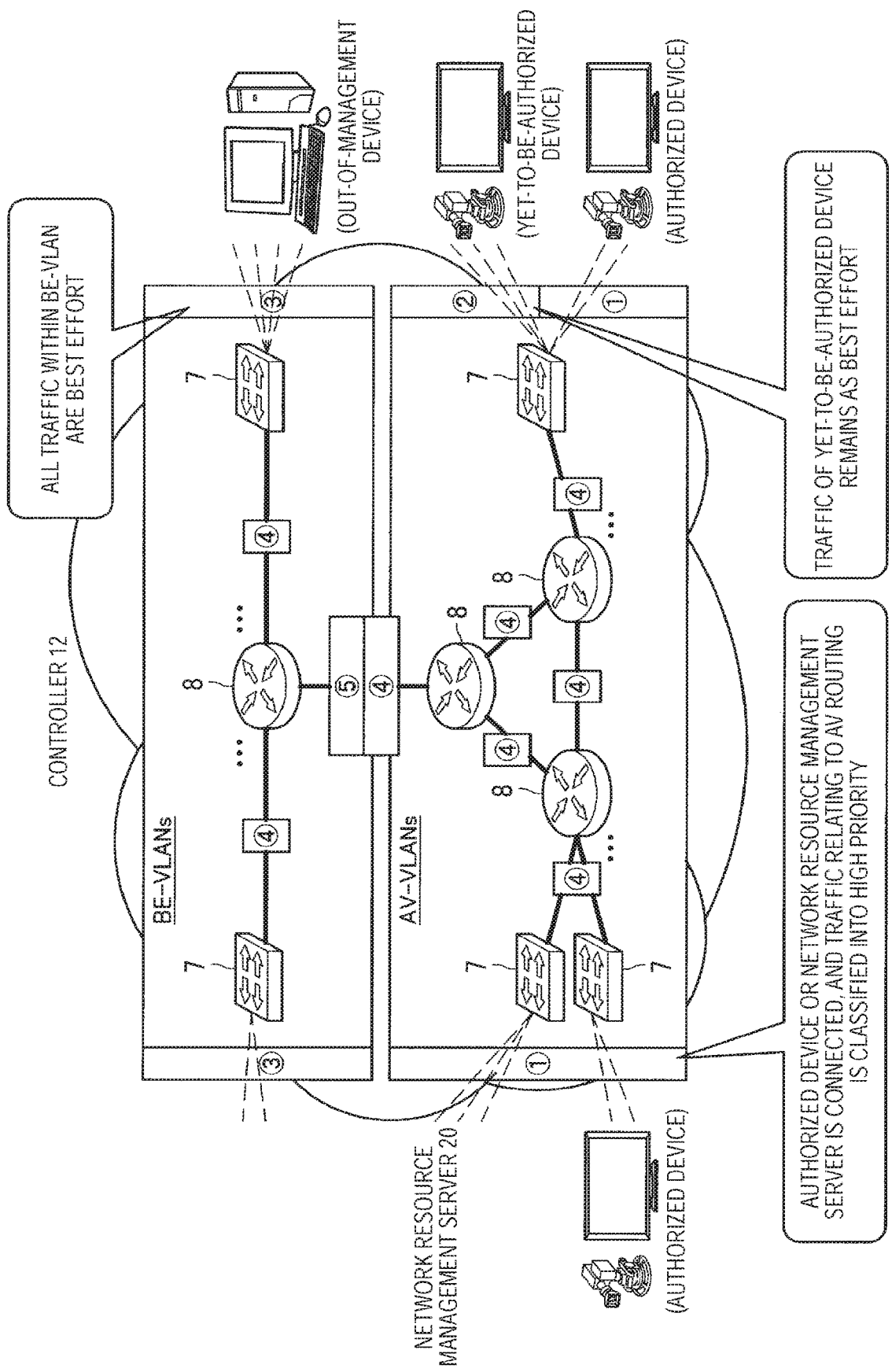
FIG. 21 is an explanatory diagram illustrating QoS guarantee of the relay management system according to the embodiment of the present disclosure.

FIG. 21 is an explanatory diagram illustrating QoS guarantee of the relay management system according to the embodiment of the present disclosure. FIG. 21 illustrates an example in which an IP network includes an AV-VLAN on which AV streams are transmitted and a BE-VLAN on which data other than AV streams are transmitted.

The QoS guarantee of the relay management system according to the embodiment of the present disclosure is mainly performed by three approaches: [1] admission control at the edge switch, [2] priority control and load balancing at the switch connection interface, and [3] filtering of irregular JOIN.

Admission control at the edge switch is mainly performed by the following three approaches, the numbers of which corresponding to the encircled numbers illustrated in FIG. 21.

(1) Priority classifying for each traffic relating to AV routing by Policer/Classification/Rewrite at the edge switch to which the device is connected, DSCP (Differentiated Services Code Point) setting, and inflow limitation based on resource reservation (Policing is set only for connection interface of the transmission device).

(2) Traffic control of a yet-to-be-authorized device using a BE filter and an IGMP filter. Proceeds to the setting of the aforementioned approach (1) when device registration is completed and the device turns out to be an authorized device.

(3) Traffic control of an out-of-management device using the BE filter.

Priority control and load balancing in the switch connection interface are performed by the following approach.

(4) Priority control of traffic based on DSCP set at the edge switch and VLAN-based load balancing.

Filtering of irregular JOIN is performed by the following approach.

(5) Policy-based routing which filters IGMP JOIN for AV streams from the BE-VLAN to the AV-VLAN. In other words, quality in the BE-VLAN is guaranteed by filtering JOIN messages from the BE-VLAN.

As illustrated in FIG. 21, the relay management system according to the embodiment of the present disclosure can guarantee QoS of traffic between authorized devices by a setting such as separating the AV-VLAN and the BE-VLAN so that AV streams to be transmitted and received by an authorized device flow into the AV-VLAN with a higher priority.

2. HARDWARE CONFIGURATION

As above, the embodiment of the present disclosure has been explained. The above described information processing such as the resource management and the transfer setting processing is realized by the cooperation of software and the hardware of the network resource management server 20 to be explained in the following.

Figure 22:
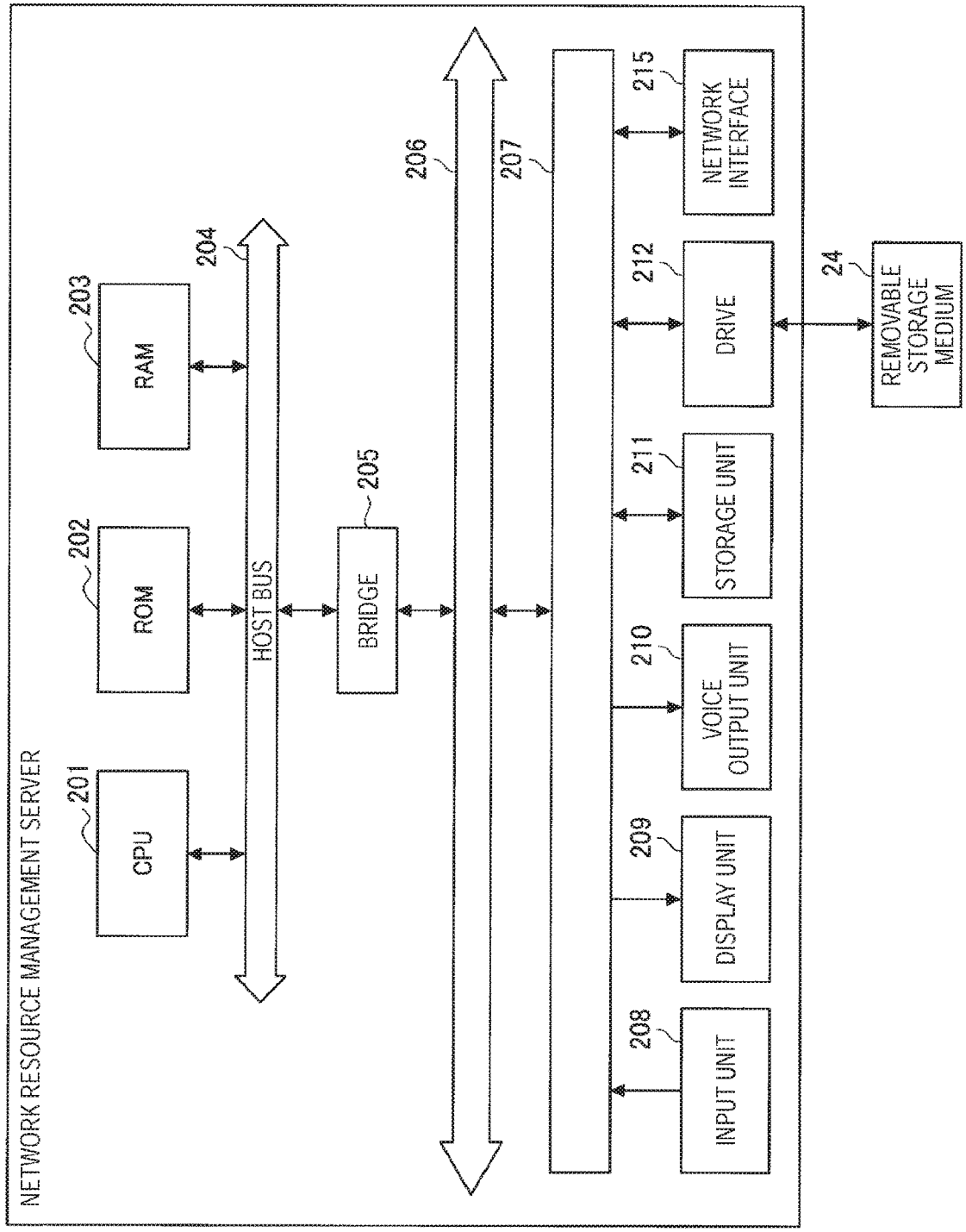
FIG. 22 is an explanatory diagram illustrating a hardware configuration example.

FIG. 22 is an explanatory diagram illustrating a hardware configuration of the network resource management server 20. As illustrated in FIG. 22, the network resource management server 20 includes a central processing unit (CPU) 201, a read only memory (ROM) 202, a random access memory (RAM) 203, an input unit 208, an output unit 210, a storage unit 211, a drive 212, and a communication unit 215.

The CPU 201 functions as an operation processing unit and a control unit, and controls the whole operation in the network resource management server 20 in accordance with various kinds of program. For example, the functions of the channel collection unit 220, the session management unit 240, the resource management unit 250, and the transfer control unit 260 which are explained with reference to FIG. 3 are realized by the cooperation of this CPU 201 and the software. Further, the CPU 201 may be a microprocessor. The ROM 202 stores a program, an operation parameter, and the like to be used by the CPU 201. The RAM 203 temporarily stores a program used in execution by the CPU 201, a parameter which is changed as needed in the execution, and the like. These units are mutually connected by a host bus configured from a CPU bus or the like.

The input unit 208 is configured from input means for a user to input information such as a mouse, a keyboard, a touch panel, a button, a microphone, a switch, and a lever, an input control circuit to generate an input signal on the basis of the user's input and to output the input signal to the CPU 201, and the like. The user of the network resource management server 20 can input various kinds of data and instruct processing operation for the network resource management server 20 by operating the input unit 208.

The output unit 210 includes a display unit such as a liquid crystal display (LCD) unit, an organic light emitting diode (OLED) unit, a lamp, and the like, for example. Further, the output unit 210 includes a voice output unit such as a speaker and a headphone. For example, the display unit displays a captured image, a generated image, or the like. On the other side, the voice output unit outputs voice data or the like which is converted into voice.

The storage unit 211 is a unit for data storage configured as an example of the storage unit of the network resource management server 20 according to the present embodiment. The storage unit 211 may include a storage medium, a recording unit to record data into the storage medium, a read unit to read data from the storage medium, a deletion unit to delete data recorded in the storage medium, and the like. This storage unit 211 stores a program to be executed by the CPU 201 and various kinds of data.

The drive 212 is a reader-writer for the recording medium, and is built in the network resource management server 20 or attached externally. The drive 212 reads information recorded in an attached removable storage medium 24 such as a magnetic disk, an optical disk, a magneto-optical disk, a semiconductor memory, and outputs the information to the RAM 203. Further, the drive 212 can write information into the removable storage medium 24.

The communication unit 215 is a communication interface configured from a communication device or the like for the connection to the L3 network, for example.

Note that, while, in the above, the hardware configuration of the network resource management server 20 is explained with reference to FIG. 22, the hardware of the controller 12, the transmission apparatus 30, the reception apparatus 40, and the like can be configured substantially in the same manner as the network resource management server 20, and explanation is omitted.

3. SUMMARY

According to the embodiment of the present disclosure, as has been described above, there is provided the network resource management server 20 capable of efficiently reserving bands of an IP network and transmitting data streams between the transmission apparatuses 30 and the reception apparatuses 40 without delay.

The network resource management server 20 according to the embodiment of the present disclosure calculates the maximum traffic that may be generated in a resource group including a pair of the transmission apparatus 30 and the reception apparatus 40, and performs band reservation in accordance with the maximum traffic. The network resource management server 20 according to the embodiment of the present disclosure becomes capable of performing efficient band reservation by the band reservation in accordance with the maximum traffic that may be generated in the resource group as thus described.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the steps in the processing of the network resource management server 20 of the present specification do not necessarily need to be processed in time series along the order described in the sequence diagram or the flowchart. For example, the steps in the processing of the network resource management server 20 may be processed in an order different from the order described in the sequence diagram, or may be processed in parallel.

Further, a computer program can be created to cause the hardware such as the CPU 201, the ROM 202, and the RAM 203 built in the network resource management server 20 to perform functions equivalent to the functions of the above described elements of the network resource management server 20. Further the storage medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A communication control device including:

a channel information acquisition unit configured to acquire, when AV streams are transmitted from a plurality of transmission apparatuses to one or more reception apparatuses on an IP network while being switched, all channel information from the transmission apparatuses to the reception apparatuses;

a traffic calculation unit configured to calculate a maximum traffic generated in switching patterns of the transmission of the AV streams from the transmission apparatuses to the reception apparatuses, on the basis of the channel information acquired by the channel information acquisition unit; and a transmission band reservation unit configured to reserve a transmission band on the IP network, on the basis of the maximum traffic calculated by the traffic calculation unit.

(2)

The communication control device according to (1), in which the transmission band reservation unit creates a list of streams for pairs of all transmission terminals of the transmission apparatuses and all reception terminals of the reception apparatuses, and performs uplink band reservation from the transmission apparatuses to a first router and downlink band reservation from the first router to the reception apparatuses.

(3)

The communication control device according to (2), in which the transmission band reservation unit records, for each link, transmission terminal information of streams which are reserved through reservation of unreserved transmission band, among streams each having a possibility to be received by a reception terminal, and reserves transmission bands for all links reaching the reception terminal.

(4)

The communication control device according to (3), in which the transmission band reservation unit reserves, in the downlink band reservation, transmission bands for two streams that are selected in descending order of bandwidth, among the streams receivable by the reception terminal.

(5)

The communication control device according to (3), in which the transmission band reservation unit reserves, in the downlink band reservation, a transmission band for one stream having a largest bandwidth, among the streams receivable by the reception terminal.

(6)

The communication control device according to (3), in which the transmission band reservation unit reserves, in the downlink band reservation, a transmission band for one stream having a largest bandwidth, among the streams receivable by the reception terminal, for each of the channels which have passed through a plurality of network interfaces connected to the reception terminal.

(7)

The communication control device according to any of (1) to (6), in which the transmission band reservation unit reserves a transmission band for each session when there is one transmission terminal in the switching pattern.

(8)

The communication control device according to any of (1) to (7), in which the IP network is a network in which a network for AV stream transmission is separated from other networks, and the communication control device further includes a switch setting unit configured to perform setting of filtering transmission of predetermined messages from the other networks to the network for AV streams.

(9)

The communication control device according to (8), in which the switch setting unit performs setting of classification into predetermined classes in which all traffic are to be transmitted with best effort to a port of a switch on the IP network to which an unauthorized device is connected, and performs setting to enable transmission of AV streams to a port to which an authorized device is connected.

(10)

The communication control device according to (8), in which the switch setting unit uses an SDN control protocol to modify setting of a switch on the IP network.

(11)

The communication control device according to any of (1) to (10), in which the IP network is a multiplexed network, and when one AV stream is transmitted to a plurality of IP networks in a load distributed manner, the transmission band reservation unit reserves a transmission band corresponding to a transmission amount of the distributed AV stream, for each multiplexed IP network.

(12)

The communication control device according to any of (1) to (11), in which the IP network is a multiplexed network, and when one AV stream is redundantly transmitted to a plurality of IP networks, the transmission band reservation unit reserves a transmission band having the same amount as the original AV stream, for all the multiplexed IP networks.

(13)

The communication control device according to any of (1) to (12), in which the transmission band reservation unit reserves a transmission band on the IP network with the maximum traffic being an upper limit.

(14)

A communication control method including:

acquiring, when AV streams are transmitted from a plurality of transmission apparatuses to one or more reception apparatuses on an IP network while being switched, all channel information from the transmission apparatuses to the reception apparatuses;

calculating a maximum traffic generated in switching patterns of the transmission of the AV streams from the transmission apparatuses to the reception apparatuses, on the basis of the acquired channel information; and reserving a transmission band on the IP network, on the basis of the calculated maximum traffic.

(15)

A communication control system including:

a plurality of transmission apparatuses connected to an IP network;

one or more reception apparatuses connected to the IP network; and a communication control device connected to the IP network, in which the communication control device includes a channel information acquisition unit configured to acquire, when AV streams are transmitted from the plurality of transmission apparatuses to the one or more reception apparatuses on the IP network while being switched, all channel information from the transmission apparatuses to the reception apparatuses, a traffic calculation unit configured to calculate a maximum traffic generated in switching patterns of the transmission of the AV streams from the transmission apparatuses to the reception apparatuses, on the basis of the channel information acquired by the channel information acquisition unit, and a transmission band reservation unit configured to reserve a transmission band on the IP network, on the basis of the maximum traffic calculated by the traffic calculation unit.

REFERENCE SIGNS LIST

7 L2 switch
8 L3 switch
10 relay apparatus
12 controller
14 imaging apparatus
16 display apparatus
20 network resource management server
30 transmission apparatus
32 multicast transmission unit
40 reception apparatus
42 multicast reception unit
220 channel collection unit
230 database
240 session management unit
250 resource management unit
252 resource reservation unit
254 switch setting unit
260 transfer control unit

The invention claimed is:

1. A communication control device, comprising:
processing circuitry configured to
acquire, when audiovisual (AV) streams are transmitted from a plurality of transmission apparatuses to one or more reception apparatuses on an Internet protocol (IP) network while being switched, channel information from the transmission apparatuses to the one or more reception apparatuses;
calculate a maximum traffic generated in switching patterns of the transmission of the AV streams from the transmission apparatuses to the one or more reception apparatuses, on a basis of a sum of transmission rates of a subset of N AV streams of the AV streams indicated by the channel information as having the N highest transmission rates, N being a number of the AV streams that is receivable by the one or more reception apparatuses simultaneously; and
reserve a transmission band on the IP network, on a basis of the maximum traffic, wherein
the IP network is a network in which a network for AV stream transmission is separated from other networks,
the processing circuitry is further configured to set a filter that filters transmission of predetermined messages from the other networks to the network for AV streams,
perform setting of classification of all transmissions that are to be transmitted with best effort to a first port of a switch on the IP network into predetermined classes, an unauthorized device being connected to the first port, and
enable the transmission of the AV streams to a second port to which an authorized device is connected.

2. The communication control device according to claim 1, wherein the processing circuitry is further configured to
create a list of streams for pairs of each of transmission terminals of the transmission apparatuses and each of reception terminals of the one or more reception apparatuses, and
reserve an uplink band from the transmission apparatuses to a first router and a downlink band from the first router to the one or more reception apparatuses.

3. The communication control device according to claim 2, wherein the processing circuitry is further configured to
record, for each link, transmission terminal information of streams which are reserved through reservation of the transmission band, among streams receivable by one of the reception terminals, and
reserve transmission bands for all links reaching the one of the reception terminals.

4. The communication control device according to claim 3, wherein the processing circuitry is further configured to reserve, in the downlink band reservation, transmission bands for two streams that are selected in descending order of transmission rate, among the streams receivable by the one of the reception terminals.

5. The communication control device according to claim 3, wherein the processing circuitry is further configured to reserve, in the downlink band reservation, a transmission band for one stream having a largest transmission rate, among the streams receivable by the one of the reception terminals.

6. The communication control device according to claim 3, wherein the processing circuitry is further configured to reserve, in the downlink band reservation, a transmission band for one stream having a largest transmission rate, among the streams receivable by the one of the reception terminals, for each of a plurality of channels which has passed through a plurality of network interfaces connected to the one of the reception terminals.

7. The communication control device according to claim 1, wherein the processing circuitry is further configured to reserve a transmission band for each session when one transmission terminal is in a switching pattern of the switching patterns.

8. The communication control device according to claim 1, wherein the processing circuitry is further configured to use a software defined networking (SDN) control protocol to modify setting of a switch on the IP network.

9. The communication control device according to claim 1, wherein
the IP network is a multiplexed network, and
when one of the AV streams is transmitted to a plurality of IP networks in a load distributed manner, the processing circuitry is further configured to reserve a transmission band corresponding to a transmission amount of the distributed AV stream, for each of the IP networks.

10. The communication control device according to claim 1, wherein
the IP network is a multiplexed network, and
when one of the AV streams is redundantly transmitted to a plurality of IP networks, the processing circuitry is further configured to reserve a same transmission band as an original AV stream, for each of the IP networks.

11. The communication control device according to claim 1, wherein the processing circuitry is further configured to reserve a transmission band on the IP network with the maximum traffic being an upper limit.

12. A communication control method comprising:
acquiring, when audiovisual (AV) streams are transmitted from a plurality of transmission apparatuses to one or more reception apparatuses on an Internet protocol (IP) network while being switched, channel information from the transmission apparatuses to the one or more reception apparatuses;
calculating a maximum traffic generated in switching patterns of the transmission of the AV streams from the transmission apparatuses to the one or more reception apparatuses, on a basis of a sum of transmission rates of a subset of N AV streams of the AV streams indicated by the acquired channel information as having the N highest transmission rates, N being a number of the AV streams that is receivable by the one or more reception apparatuses simultaneously; and reserving a transmission band on the IP network, on a basis of the calculated maximum traffic, wherein the IP network is a network in which a network for AV stream transmission is separated from other networks; and the method further includes:

setting a filter that filters transmission of predetermined messages from the other networks to the network for AV streams, performing setting of classification of all transmissions that are to be transmitted with best effort to a first port of a switch on the IP network into predetermined classes, an unauthorized device being connected to the first port, and enabling the transmission of the AV streams to a second port to which an authorized device is connected.

13. A communication control system comprising:

a plurality of transmission apparatuses connected to an Internet protocol (IP) network;

one or more reception apparatuses connected to the IP network; and a communication control device connected to the IP network, wherein the communication control device includes processing circuitry configured to acquire, when audiovisual (AV) streams are transmitted from the plurality of transmission apparatuses to the one or more reception apparatuses on the IP network while being switched, channel information from the transmission apparatuses to the one or more reception apparatuses, calculate a maximum traffic generated in switching patterns of the transmission of the AV streams from the transmission apparatuses to the one or more reception apparatuses, on a basis of a sum of transmission rates of a subset of N AV streams of the AV streams indicated by the channel information as having the N highest transmission rates, N being a number of the AV streams that is receivable by the one or more reception apparatuses simultaneously, and reserve a transmission band on the IP network, on a basis of the maximum traffic;

the IP network is a network in which a network for AV stream transmission is separated from other networks;

the processing circuitry is further configured to set a filter that filters transmission of predetermined messages from the other networks to the network for AV streams;

perform setting of classification of all transmissions that are to be transmitted with best effort to a first port of a switch on the IP network into predetermined classes, an unauthorized device being connected to the first port; and enable the transmission of the AV streams to a second port to which an authorized device is connected.

\* \* \* \* \*